United States Patent  
Holt

(10) Patent No.: US 7,996,627 B2
(45) Date of Patent: Aug. 9, 2011

(54) REPLICATION OF OBJECT GRAPHS

(75) Inventor: John M. Holt, Essex (GB)

(73) Assignee: Waratek Pty Ltd, Lindfield, NSW (AU)

( * ) Notice: Subject to any disclaimer, the term of this patent is extended or adjusted under 35 U.S.C. 154(b) by 619 days.

(21) Appl. No.: 12/011,198

(22) Filed: Jan. 23, 2008

(65) Prior Publication Data
US 2008/0215593 A1 Sep. 4, 2008

Related U.S. Application Data

(62) Division of application No. 11/583,948, filed on Oct. 18, 2006.

(60) Provisional application No. 60/730,354, filed on Oct. 25, 2005.

(51) Int. Cl.
G06F 12/00 (2006.01)

(52) U.S. Cl. ........ 711/147; 711/150; 711/161; 711/162; 714/6.23

(58) Field of Classification Search .................. 711/147, 711/150, 161, 162; 714/6.23
See application file for complete search history.

(56) References Cited

U.S. PATENT DOCUMENTS

| 4,969,092 A | 11/1990 | Shorter |
| 5,214,776 A | 5/1993 | Bagnoli et al. |
| 5,291,597 A | 3/1994 | Shorter |
| 5,418,966 A | 5/1995 | Madduri |
| 5,434,994 A | 7/1995 | Shaheen et al. |
| 5,488,723 A | 1/1996 | Baradel et al. |
| 5,544,345 A | 8/1996 | Carpenter et al. |
| 5,568,609 A | 10/1996 | Sugiyama et al. |
| 5,612,865 A | 3/1997 | Dasgupta |
| 5,802,585 A | 9/1998 | Scales et al. |
| 5,918,248 A | 6/1999 | Newell et al. |
| 6,049,809 A | 4/2000 | Raman et al. |
| 6,148,377 A | 11/2000 | Carter et al. |
| 6,163,801 A | 12/2000 | O'Donnell et al. |

(Continued)

FOREIGN PATENT DOCUMENTS
EP 0969377 1/2000
(Continued)

OTHER PUBLICATIONS

Bal et al., "A Distributed Implementation of the Shared Data-Object Model", Proc. USENIX Workshop on Experiences with Distributed and Multiprocessor Systems pp. 1-19 (1989).

(Continued)

*Primary Examiner* — Jae U Yu
(74) *Attorney, Agent, or Firm* — Pillsbury Winthrop Shaw Pittman LLP

(57) ABSTRACT

The updating of only some memory locations in a multiple computer environment in which at least one applications program (50) executes simultaneously on a plurality of computers M1, M2 . . . Mn each of which has a local memory, is disclosed. Objects A and B in each local memory are disclosed which each include primitive fields (11). However, the simultaneous operation of the application program (50) can result in a "non-primitive" reference field (10) in one machine which must then be replicated in all other machines. However, the reference field (10) references another object (H) in the one machine's local memory so corresponding objects (T, K) must be created in the local memory of each other machine and be referenced by the corresponding non-primitive field (10).

89 Claims, 13 Drawing Sheets

U.S. PATENT DOCUMENTS

| | | |
|---|---|---|
| 6,192,514 B1 | 2/2001 | Lurndal |
| 6,314,558 B1 | 11/2001 | Angel et al. |
| 6,324,587 B1 | 11/2001 | Trenbeath et al. |
| 6,327,630 B1 | 12/2001 | Carroll et al. |
| 6,370,625 B1 | 4/2002 | Carmean et al. |
| 6,389,423 B1 | 5/2002 | Sakakura |
| 6,425,016 B1 | 7/2002 | Banavar et al. |
| 6,571,278 B1 | 5/2003 | Negishi et al. |
| 6,574,628 B1 | 6/2003 | Kahn et al. |
| 6,574,674 B1 | 6/2003 | May et al. |
| 6,611,955 B1 | 8/2003 | Logean et al. |
| 6,625,751 B1 | 9/2003 | Starovic et al. |
| 6,668,260 B2 | 12/2003 | Zoltan |
| 6,757,896 B1 | 6/2004 | Cohen et al. |
| 6,760,903 B1 | 7/2004 | Morshed et al. |
| 6,775,831 B1 | 8/2004 | Carrasco et al. |
| 6,779,093 B1 | 8/2004 | Gupta |
| 6,782,492 B1 | 8/2004 | Nakaso |
| 6,823,511 B1 | 11/2004 | McKenney et al. |
| 6,862,608 B2 | 3/2005 | Buhlman et al. |
| 6,954,794 B2 | 10/2005 | Rudd et al. |
| 6,968,372 B1 | 11/2005 | Thompson et al. |
| 7,010,576 B2 | 3/2006 | Bae |
| 7,020,736 B1 | 3/2006 | Cherukuri |
| 7,031,989 B2 | 4/2006 | Elmendorf et al. |
| 7,047,341 B2 | 5/2006 | Jung |
| 7,047,521 B2 | 5/2006 | Bunnell |
| 7,058,826 B2 | 6/2006 | Fung |
| 7,082,604 B2 | 7/2006 | Schneiderman |
| 7,206,827 B2 | 4/2007 | Viswanath et al. |
| 2002/0199172 A1 | 12/2002 | Bunnell |
| 2003/0004924 A1 | 1/2003 | Williams |
| 2003/0005407 A1 | 1/2003 | Hines |
| 2003/0067912 A1 | 4/2003 | Mead et al. |
| 2003/0105816 A1 | 6/2003 | Goswani |
| 2003/0191921 A1* | 10/2003 | Hauck et al. ................. 711/202 |
| 2004/0073828 A1 | 4/2004 | Bronstein |
| 2004/0093588 A1 | 5/2004 | Gschwind et al. |
| 2004/0158819 A1 | 8/2004 | Cuomo et al. |
| 2004/0163077 A1 | 8/2004 | Dimpsey et al. |
| 2005/0039171 A1 | 2/2005 | Avakian et al. |
| 2005/0086384 A1 | 4/2005 | Ernst |
| 2005/0108481 A1 | 5/2005 | Iyengar et al. |
| 2005/0240737 A1 | 10/2005 | Holt |
| 2005/0257219 A1 | 11/2005 | Holt |
| 2005/0262313 A1 | 11/2005 | Holt |
| 2005/0262513 A1 | 11/2005 | Holt |
| 2006/0020913 A1 | 1/2006 | Holt |
| 2006/0080389 A1 | 4/2006 | Powers et al. |
| 2006/0095483 A1 | 5/2006 | Holt |
| 2006/0143350 A1 | 6/2006 | Miloushev et al. |
| 2006/0167878 A1 | 7/2006 | Hartman |
| 2006/0242464 A1 | 10/2006 | Holt |
| 2006/0253844 A1 | 11/2006 | Holt |
| 2006/0265703 A1 | 11/2006 | Holt |
| 2006/0265704 A1 | 11/2006 | Holt |
| 2006/0265705 A1 | 11/2006 | Holt |
| 2008/0072238 A1 | 3/2008 | Monnie et al. |
| 2008/0189700 A1 | 8/2008 | Schmidt et al. |

FOREIGN PATENT DOCUMENTS

| | | |
|---|---|---|
| WO | WO95/08809 | 3/1995 |
| WO | WO98/58330 | 12/1998 |
| WO | WO02/44835 | 6/2002 |
| WO | WO03/083614 | 10/2003 |
| WO | WO03084116 | 10/2003 |
| WO | WO2005/103924 | 11/2005 |
| WO | WO2005/103925 | 11/2005 |
| WO | WO2005/103926 | 11/2005 |
| WO | WO2005/103927 | 11/2005 |
| WO | WO2005/103928 | 11/2005 |
| WO | WO2006/110937 | 10/2006 |
| WO | WO2006/110957 | 10/2006 |

OTHER PUBLICATIONS

Bal et al., "Experience with Distributed Programming in Orca", *Proc. IEEE CS International Conference on Computer Languages*, pp. 79-89 (1990).

Bal et al., "Object Distribution in ORCA Using Compile-Time and Run_Time Techniques", Proc. Conference on Object-Oriented Programming Systems, Languages and Applications pp. 162-177 (1993).

Bal et al., "Orca: A Language for Paralell Programming of Distributed Systems", *IEEE Transactions on Software Engineering*, 18(3):190-205 (2002).

Bal et al., "Replication Techniques for Speeding up Parallel Applications on Distributed Sysytems", *Concurrency Practice & Experience*, 4(5):337-355 (1992).

Bressoud, T.C. TFT: "A Software System for Application-Transparent Fault Tolerance. Proc.", $28^{th}$ Annual International Symposium on Fault-Tolerant Computing, pp. 128-137 (1998).

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

Aridor, et al. "cJVM: a single System Image of a JVM on a Cluster" Proceedings of the International Conference on Parallel Processing, pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19 , Oct. 1998, Fort Lauderdale, FL.

Bal, et al., "Experience with Distributed Programming in Orca", *IEEE CS International Conference on Computer Languages*, pp. 1-23 , Mar. 1990, New Orleans, Louisiana.

Bal, et al., "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications on Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al. "Munin: Distributed Shared Memory Based on Type Specific Memory Coherence." Dept. Elec & Computer Engr. pp. 1-9 ACM, PPOPP' 90, Feb. 1990.

Bressoud, T.C. TFT: "A Software System for Application-Transparent Fault Tolerance. Proc.", $28^{th}$ Annual International Symposium on Fault-Tolerant Computing, pp. 128-137, Jun. 1998, Munich, Germany.

Chen, et al., "Multi-Jav: a distributed shared memory system based on multiple Java virtual machines." Proc. of Conf on Parallel & Distrib. Proc. Techn. & Appls., Las Vegas, NV, Jun. 1998.

Dasilva, et al. "An evaluation of Java system architecture." IEEE Prc. 15th Symposium on Computer Architecture & High Performance Computing, pp. 1-9, Nov. 10-12, 2003, San Paulo, Brazil.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Goethe, et al. "The Distributed Ada Run-Time System DARTS." Software Prac. & Experience, vol. 21, No. 1, pp. 1249-1263, Aug. 4, 1989.

Haumacher, et al. "Transparent distributed threads for Java," Parallel & Distributed Proc. Symposium 2003. Proc. Int'l. pp. 22-26, Apr. 2003.

Puatu, "Distributed Garbage Collection of Active Objects with No Global Synchronisation"—Lecture Notes in Computer Science, Memory Management [online], XP008098868 ISSN: 0302-9743 ISBN: 978-3-540-55940-5- Retreived from the internet URL:http//www.springerlink.com/content/5v 028411810p6m700/>,vol. 637, pp. 148-1694 Sep. 17-19, 1992, IWMM 92, St. Malo, France.

Larus, et al. "EEL: machine-independent executable editing. 1995 ACM SIGGPLAN '95." pp. 291-300 Jun. 21-22, 1995.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. Conf. 13, May 25, 1993, pp. 491-498, WP010095684 ISBN:978-0/8186-3770-4.

Radovic, et al., "Removing the overhead from software-based shared memory." Prc. 2001 ACM/IEEE Conf. Supercomputing (CDrom), Denver CO, Nov. Oct. 16, 2001, Supercomuting '01. ACM Press. NY.

Russ, et al. "The hector distributed run-time environment", IEEEE Transactions on Parallel and Distributed Systems, vol. 9, No. 111998, May 22, 1998.

Sanchez, et al. "Distributed Garbage Collection for Wide Area Replicated memory", Proceedings of the 6th Conference on Usenix Conference on Object-Orientated technologies and Systems [On Line], vol. 6, Jun. 29, 2001, pp. 1-14, P1-14XP002502672 Retrieved from the Internet URL:http://portal.acm.org/citation.cfm?id=1268246 http://citeseerx.ist.psu.edu/viewdoc/summary?doi=10.1.1.10.5675 http://www.gsd.inesc-id.pt/{veiga/papers/dgcwarm-coots-2001.pdf>.

Shapiro, et al., "A Distributed Shared Memory and its Garbage Collector", Lecture notes in Computer Science, vol. 972, Proceedings of the 9th International Workshop on Distributed Algorithms, pp. 198-214, Sep. 13-15, 1995.

Supplementary European Search Report EP 06 79 0317 Dated Mar. 5, 2009.

* cited by examiner

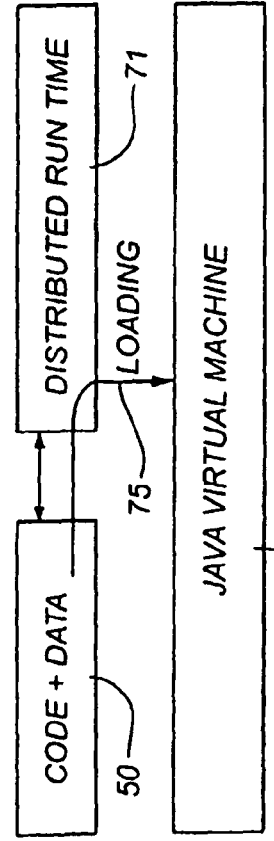
FIG. 1A
PRIOR ART
FIG. 1B
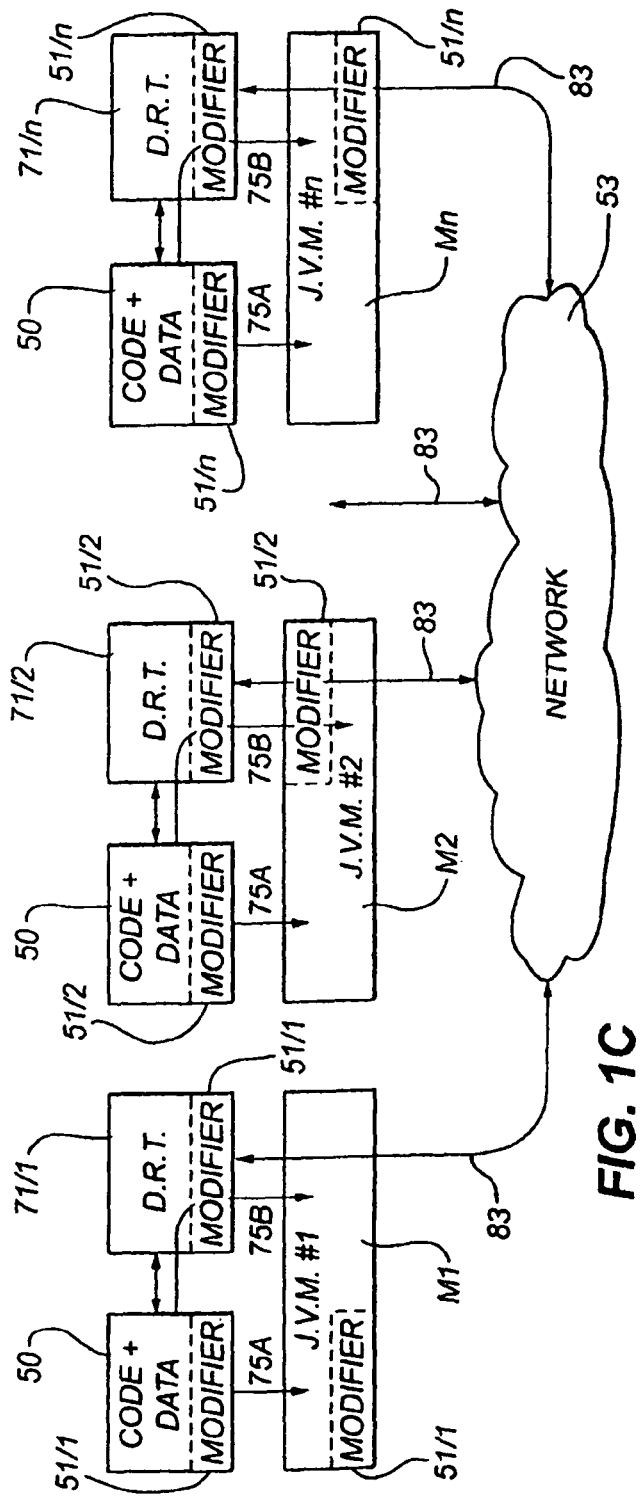
FIG. 1C

| GLOBAL |
|---|
| C<br>CRANIUM |
|  |
|  |

| Mn-1 | Mn | Mn+1 |
|---|---|---|
| K<br>KOPF | H<br>HEAD | T<br>TÊTE |
|  |  |  |
|  |  |  |

FIG. 6

REPLICATION OF OBJECT GRAPHS

CROSS-REFERENCE TO RELATED APPLICATIONS

This is a divisional of U.S. application Ser. No. 11/583,948 filed Oct. 18, 2006 entitled "Replication of Object Graphs," and claims benefit of priority to U.S. Provisional Application No. 60/730,354 entitled "Replication of Object Graphs" filed Oct. 25, 2005; which is hereby incorporated by reference.

FIELD OF THE INVENTION

The present invention relates to computing and, in particular, to the simultaneous operation of a plurality of computers interconnected via a communications network.

BACKGROUND ART

International Patent Application No. PCT/AU2005/000580 published under WO 2005/103926 (to which U.S. patent application Ser. No. 11/111,946 and published under No. 2005-0262313 corresponds) in the name of the present applicant, discloses how different portions of an application program written to execute on only a single computer can be operated substantially simultaneously on a corresponding different one of a plurality of computers. That simultaneous operation has not been commercially used as of the priority date of the present application. International Patent Application Nos. PCT/AU2005/001641 to which U.S. patent application Ser. No. 11/259,885 entitled: "Computer Architecture Method of Operation for Multi-Computer Distributed Processing and Co-ordinated Memory and Asset Handling" corresponds and PCT/AU2006/000532 in the name of the present applicant and unpublished as at the priority date of the present application, also disclose further details. The contents of each of the abovementioned prior application(s) are hereby incorporated into the present application by cross reference for all purposes.

Briefly stated, the abovementioned patent specifications disclose that at least one application program written to be operated on only a single computer can be simultaneously operated on a number of computers each with independent local memory. The memory locations required for the operation of that program are replicated in the independent local memory of each computer. On each occasion on which the application program writes new data to any replicated memory location, that new data is transmitted and stored at each corresponding memory location of each computer. Thus apart from the possibility of transmission delays, each computer has a local memory the contents of which are substantially identical to the local memory of each other computer and are updated to remain so. Since all application programs, in general, read data much more frequently than they cause new data to be written, the abovementioned arrangement enables very substantial advantages in computing speed to be achieved. In particular, the stratagem enables two or more commodity computers interconnected by a commodity communications network to be operated simultaneously running under the application program written to be executed on only a single computer.

High-level languages including JAVA and MICROSOFT-.NET are written to be operated on only a single computer and have two types of memory locations or fields. The first of these is a so-called "primitive" field which contains alphanumeric data such as numbers or letters. This content is easily duplicated merely by being copied to another primitive field. The second type of field is a "non-primitive" field generally termed a reference field which essentially contains "a pointer" to another memory location or another object. The programming language written to be operated on only a single computer uses one or more pointers to re-direct the operation of the computer to the referenced address. In a multiple computer system, if the pointers were slavishly copied then they would point to identical memory locations in the other machines but these locations may, or may not, have the same memory contents.

The genesis of the present invention is a desire to facilitate the replication of non-primitive fields in a multiple computer system thereby permitting the desired goal of substantially identical memory structure and content to be approached as closely as possible.

SUMMARY OF THE INVENTION

In accordance with a first aspect of the present invention there is disclosed a method of replicating non-primitive fields of duplicated objects in a multiple computer environment in which different portions of at least one application program execute simultaneously on different ones of multiple computers interconnected via a communications network, said method of comprising the steps of:
(i) creating a concordance table and for each object present in any one of said multiple computers making the entries in said concordance table correspond to each reference to said object,
(ii) replicating said concordance table in each computer or allowing each computer to access a corresponding portion of a single concordance table for all machines present in a server computer, each said entry in said concordance table containing a local pointer to the local memory object referenced by the object of said one machine, and
(iii) having each said other machine designate a corresponding non-primitive field and local object and entering the corresponding local pointer of the corresponding local memory object in said table or tables.

In accordance with a second aspect of the present invention there is disclosed a multiple computer system in which different portions of at least one application program execute simultaneously on different ones of the multiple computers which are interconnected via a communications network, wherein for each non-primitive field created in any one of said computers there is a corresponding entry in a concordance table accessible by all said computers or replicated in each said computer, said table entry containing a local pointer to the local memory object referenced by said non-primitive field of said one computer, and wherein each other said computer designates a corresponding non-primitive field and local object and the corresponding local pointer of the corresponding local memory object is entered in said concordance table or tables.

In accordance with a third aspect of the present invention there is disclosed a plurality of computers interconnected via a communications network and operable to ensure carrying out of the above method.

In accordance with a fourth aspect of the present invention there is disclosed a computer program product comprising a set of program instructions stored in a storage medium and operable to permit a plurality of computers to carry out the above method.

In accordance with a fifth aspect of the present invention there is disclosed a single computer adapted to co-operate with at least one other computer in order to carry out the above method or form the above computer system.

BRIEF DESCRIPTION OF THE DRAWINGS

FIG. 1A is a schematic illustration of a prior art computer arranged to operate JAVA code and thereby constitute a single JAVA virtual machine, FIG. 1B is a drawing similar to FIG. 1A but illustrating the initial loading of code, FIG. 1C illustrates the interconnection of a multiplicity of computers each being a JAVA virtual machine to form a multiple computer system, FIG. 2 schematically illustrates "n" application running computers to which at least one additional server machine X is connected as a server, FIG. 6 is a table listing the corresponding reference fields.

DETAILED DESCRIPTION

Figure 2:
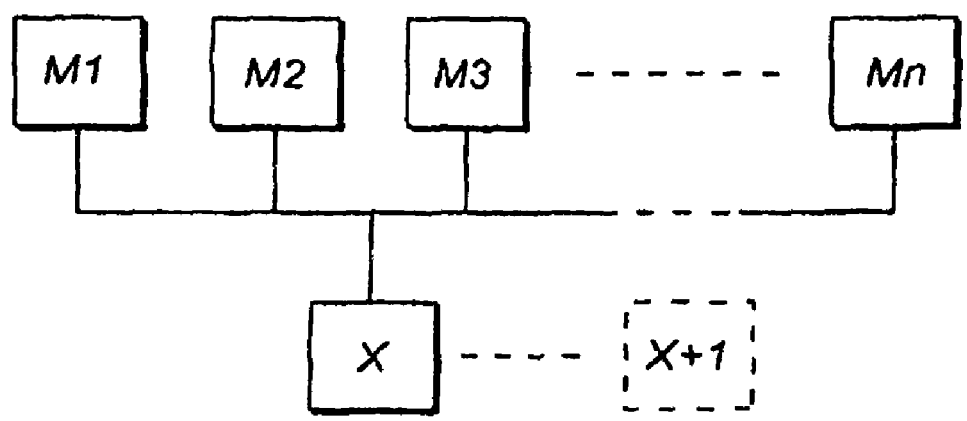

The embodiments will be described with reference to the JAVA language, however, it will be apparent to those skilled in the art that the invention is not limited to this language and, in particular can be used with other languages (including procedural, declarative and object oriented languages) including the MICROSOFT.NET platform and architecture (Visual Basic, Visual C, and Visual C++, and Visual C#), FORTRAN, C, C++, COBOL, BASIC and the like.

It is known in the prior art to provide a single computer or machine (produced by any one of various manufacturers and having an operating system (or equivalent control software or other mechanism) operating in any one of various different languages) utilizing the particular language of the application by creating a virtual machine as illustrated in FIG. 1A.

The code and data and virtual machine configuration or arrangement of FIG. 1A takes the form of the application code 50 written in the JAVA language and executing within the JAVA virtual machine 61. Thus where the intended language of the application is the language JAVA, a JAVA virtual machine is used which is able to operate code in JAVA irrespective of the machine manufacturer and internal details of the computer or machine. For further details, see "The JAVA Virtual Machine Specification" $2^{nd}$ Edition by T. Lindholm and F. Yellin of Sun Microsystems Inc of the USA which is incorporated herein by reference.

This conventional art arrangement of FIG. 1A is modified in accordance with embodiments of the present invention by the provision of an additional facility which is conveniently termed a "distributed run time" or a "distributed run time system" DRT 71 and as seen in FIG. 1B.

In FIGS. 1B and 1C, the application code 50 is loaded onto the Java Virtual Machine(s) M1, M2 . . . Mn in cooperation with the distributed runtime system 71, through the loading procedure indicated by arrow 75 or 75A or 75B. As used herein the terms "distributed runtime" and the "distributed run time system" are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. A runtime system (whether a distributed runtime system or not) typically deals with the details of the interface between the program and the operating system such as system calls, program start-up and termination, and memory management. For purposes of background, a conventional Distributed Computing Environment (DCE) (that does not provide the capabilities of the inventive distributed run time or distributed run time system 71 used in the preferred embodiments of the present invention) is available from the Open Software Foundation. This Distributed Computing Environment (DCE) performs a form of computer-to-computer communication for software running on the machines, but among its many limitations, it is not able to implement the desired modification or communication operations. Among its functions and operations the preferred DRT 71 coordinates the particular communications between the plurality of machines M1, M2, . . . Mn. Moreover, the preferred distributed runtime 71 comes into operation during the loading procedure indicated by arrow 75A or 75B of the JAVA application 50 on each JAVA virtual machine 72 or machines JVM#1, JVM#2, . . . JVM#n of FIG. 1C. It will be appreciated in light of the description provided herein that although many examples and descriptions are provided relative to the JAVA language and JAVA virtual machines so that the reader may get the benefit of specific examples, the invention is not restricted to either the JAVA language or JAVA virtual machines, or to any other language, virtual machine, machine or operating environment.

FIG. 1C shows in modified form the arrangement of the JAVA virtual machines, each as illustrated in FIG. 1B. It will be apparent that again the same application code 50 is loaded onto each machine M1, M2 . . . Mn. However, the communications between each machine M1, M2 . . . Mn are as indicated by arrows 83, and although physically routed through the machine hardware, are advantageously controlled by the individual DRT's 71/1 . . . 71/n within each machine. Thus, in practice this may be conceptionalised as the DRT's 71/1, . . . 71/n communicating with each other via the network or other communications link 53 rather than the machines M1, M2 . . . Mn communicating directly themselves or with each other. Contemplated and included are either this direct communication between machines M1, M2 . . . Mn or DRT's 71/1, 71/2 . . . 71/n or a combination of such communications. The preferred DRT 71 provides communication that is transport, protocol, and link independent.

The one common application program or application code 50 and its executable version (with likely modification) is simultaneously or concurrently executing across the plurality of computers or machines M1, M2 . . . Mn. The application program 50 is written to execute on a single machine or computer (or to operate on the multiple computer system of the abovementioned patent applications which emulate single computer operation). Essentially the modified structure is to replicate an identical memory structure and contents on each of the individual machines.

The term "common application program" is to be understood to mean an application program or application program code written to operate on a single machine, and loaded and/or executed in whole or in part on each one of the plurality of computers or machines M1, M2 . . . Mn, or optionally on each one of some subset of the plurality of computers or machines M1, M2 . . . Mn. Put somewhat differently, there is a common application program represented in application code 50. This is either a single copy or a plurality of identical copies each individually modified to generate a modified copy or version of the application program or program code. Each copy or instance is then prepared for execution on the corresponding machine. At the point after they are modified they are common in the sense that they perform similar operations and operate consistently and coherently with each other. It will be appreciated that a plurality of computers, machines, information appliances, or the like implementing embodiments of the invention may optionally be connected to or coupled with other computers, machines, information appliances, or the like that do not implement embodiments of the invention.

The same application program 50 (such as for example a parallel merge sort, or a computational fluid dynamics application or a data mining application) is run on each machine, but the executable code of that application program is modified on each machine as necessary such that each executing instance (copy or replica) on each machine coordinates its local operations on that particular machine with the operations of the respective instances (or copies or replicas) on the other machines such that they function together in a consistent, coherent and coordinated manner and give the appearance of being one global instance of the application (i.e. a "meta-application").

The copies or replicas of the same or substantially the same application codes, are each loaded onto a corresponding one of the interoperating and connected machines or computers. As the characteristics of each machine or computer may differ, the application code 50 may be modified before loading, or during the loading process, or with some disadvantages after the loading process, to provide a customization or modification of the application code on each machine. Some dissimilarity between the programs or application codes on the different machines may be permitted so long as the other requirements for interoperability, consistency, and coherency as described herein can be maintained. As it will become apparent hereafter, each of the machines M1, M2 . . . Mn and thus all of the machines M1, M2 . . . Mn have the same or substantially the same application code 50, usually with a modification that may be machine specific.

Before the loading of, or during the loading of, or at any time preceding the execution of, the application code 50 (or the relevant portion thereof) on each machine M1, M2 . . . Mn, each application code 50 is modified by a corresponding modifier 51 according to the same rules (or substantially the same rules since minor optimizing changes are permitted within each modifier 51/1, 51/2 . . . 51/n).

Each of the machines M1, M2 . . . Mn operates with the same (or substantially the same or similar) modifier 51 (in some embodiments implemented as a distributed run time or DRT71 and in other embodiments implemented as an adjunct to the application code and data 50, and also able to be implemented within the JAVA virtual machine itself). Thus all of the machines M1, M2 . . . Mn have the same (or substantially the same or similar) modifier 51 for each modification required. A different modification, for example, may be required for memory management and replication, for initialization, for finalization, and/or for synchronization (though not all of these modification types may be required for all embodiments).

There are alternative implementations of the modifier 51 and the distributed run time 71. For example, as indicated by broken lines in FIG. 1C, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71 such as within the code and data 50, or within the JAVA virtual machine itself. In one embodiment, both the modifier 51 and DRT 71 are implemented or written in a single piece of computer program code that provides the functions of the DRT and modifier. In this case the modifier function and structure is, in practice, subsumed into the DRT. Independent of how it is implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT can, for example, implement a communications stack in the JAVA language and use the Transmission Control Protocol/Internet Protocol (TCP/IP) to provide for communications or talking between the machines. These functions or operations may be implemented in a variety of ways, and it will be appreciated in light of the description provided herein that exactly how these functions or operations are implemented or divided between structural and/or procedural elements, or between computer program code or data structures, is not important or crucial to the invention.

However, in the arrangement illustrated in FIG. 1C, a plurality of individual computers or machines M1, M2 . . . Mn are provided, each of which are interconnected via a communications network 53 or other communications link. Each individual computer or machine is provided with a corresponding modifier 51. Each individual computer is also provided with a communications port which connects to the communications network. The communications network 53 or path can be any electronic signalling, data, or digital communications network or path and is preferably a slow speed, and thus low cost, communications path, such as a network connection over the Internet or any common networking configurations including ETHERNET or INFINIBAND and extensions and improvements, thereto. Preferably, the computers are provided with one or more known communications ports (such as CISCO Power Connect 5224 Switches) which connect with the communications network 53.

As a consequence of the above described arrangement, if each of the machines M1, M2, . . . , Mn has, say, an internal or local memory capability of 10 MB, then the total memory available to the application code 50 in its entirety is not, as one might expect, the number of machines (n) times 10 MB. Nor is it the additive combination of the internal memory capability of all n machines. Instead it is either 10 MB, or some number greater than 10 MB but less than n×10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as 'common' memory (i.e. similar equivalent memory on each of the machines M1 . . . Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 . . . Mn has a private (i.e. 'non-common') internal memory capability. The private internal memory capability of the machines M1, M2, . . . , Mn are normally approximately equal but need not be. For example, when a multiple computer system is implemented or organized using existing computers, machines, or information appliances, owned or operated by different entities, the internal memory capabilities may be quite different. On the other hand, if a new multiple computer system is being implemented, each machine or computer is preferably selected to have an identical internal memory capability, but this need not be so.

It is to be understood that the independent local memory of each machine represents only that part of the machine's total memory which is allocated to that portion of the application program running on that machine. Thus, other memory will be occupied by the machine's operating system and other computational tasks unrelated to the application program 50.

Non-commercial operation of a prototype multiple computer system indicates that not every machine or computer in the system utilises or needs to refer to (e.g. have a local replica of) every possible memory location. As a consequence, it is possible to operate a multiple computer system without the local memory of each machine being identical to every other machine, so long as the local memory of each machine is sufficient for the operation of that machine. That is to say, provided a particular machine does not need to refer to (for example have a local replica of) some specific memory locations, then it does not matter that those specific memory locations are not replicated in that particular machine.

It may also be advantageous to select the amounts of internal memory in each machine to achieve a desired performance level in each machine and across a constellation or network of connected or coupled plurality of machines, computers, or information appliances M1, M2, . . . , Mn. Having described these internal and common memory considerations, it will be apparent in light of the description provided herein that the amount of memory that can be common between machines is not a limitation.

In some embodiments, some or all of the plurality of individual computers or machines can be contained within a single housing or chassis (such as so-called "blade servers" manufactured by Hewlett-Packard Development Company, Intel Corporation, IBM Corporation and others) or the multiple processors (eg symmetric multiple processors or SMPs) or multiple core processors (eg dual core processors and chip multithreading processors) manufactured by Intel, AMD, or others, or implemented on a single printed circuit board or even within a single chip or chipset. Similarly, also included are computers or machines having multiple cores, multiple CPU's or other processing logic.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform and/or virtual machine and/or machine and/or runtime system environment, and utilize the platform, and/or virtual machine and/or machine and/or runtime system and/or language architecture irrespective of the machine or processor manufacturer and the internal details of the machine. It will also be appreciated that the platform and/or runtime system can include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the inventive structure, method and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the Power PC computer architecture manufactured by International Business Machines Corporation and others, and the personal computer products made by Apple Computer, Inc., and others.

For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records), derived types, or other code or data structures of procedural languages or other languages and environments such as functions, pointers, components, modules, structures, reference and unions. These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

This analysis or scrutiny of the application code 50 can take place either prior to loading the application program code 50, or during the application program code 50 loading procedure, or even after the application program code 50 loading procedure (or some combination of these). It may be likened to an instrumentation, program transformation, translation, or compilation procedure in that the application code can be instrumented with additional instructions, and/or otherwise modified by meaning-preserving program manipulations, and/or optionally translated from an input code language to a different code language (such as for example from source-code language or intermediate-code language to object-code language or machine-code language). In this connection it is understood that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object code), and compilation from source-code to source-code, as well as compilation from object-code to object code, and any altered combinations therein. It is also inclusive of so-called "intermediary-code languages" which are a form of "pseudo object-code".

By way of illustration and not limitation, in one embodiment, the analysis or scrutiny of the application code 50 takes place during the loading of the application program code such as by the operating system reading the application code 50 from the hard disk or other storage device, medium or source and copying it into memory and preparing to begin execution of the application program code. In another embodiment, in a JAVA virtual machine, the analysis or scrutiny may take place during the class loading procedure of the java.lang.ClassLoader.loadClass method (e.g. "java.lang.ClassLoader.loadClass( )").

Alternatively, or additionally, the analysis or scrutiny of the application code 50 (or of a portion of the application code) may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

Persons skilled in the computing arts will be aware of various possible techniques that may be used in the modification of computer code, including but not limited to instrumentation, program transformation, translation, or compilation means and/or methods.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code.

The present invention encompasses all such modification routes and also a combination of two, three or even more, of such routes.

The DRT 71 or other code modifying means is responsible for creating or replicating a memory structure and contents on each of the individual machines M1, M2 . . . Mn that permits the plurality of machines to interoperate. In some embodiments this replicated memory structure will be identical. Whilst in other embodiments this memory structure will have portions that are identical and other portions that are not. In still other embodiments the memory structures are different only in format or storage conventions such as Big Endian or Little Endian formats or conventions.

These structures and procedures when applied in combination when required, maintain a computing environment where the memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M, M2 . . . Mn.

Therefore the terminology "one", "single", and "common" application code or program includes the situation where all machines M1, M2 . . . Mn are operating or executing the same program or code and not different (and unrelated) programs, in other words copies or replicas of same or substantially the same application code are loaded onto each of the interoperating and connected machines or computers.

In conventional arrangements utilising distributed software, memory access from one machine's software to memory physically located on another machine typically takes place via the network interconnecting the machines. Thus, the local memory of each machine is able to be accessed by any other machine and can therefore cannot be said to be independent. However, because the read and/or write memory access to memory physically located on another computer require the use of the slow network interconnecting the computers, in these configurations such memory accesses can result in substantial delays in memory read/write processing operations, potentially of the order of $10^6$-$10^7$ cycles of the central processing unit of the machine (given contemporary processor speeds). Ultimately this delay is dependent upon numerous factors, such as for example, the speed, bandwidth, and/or latency of the communication network. This in large part accounts for the diminished performance of the multiple interconnected machines in the prior art arrangement.

However, in the present arrangement all reading of memory locations or data is satisfied locally because a current value of all (or some subset of all) memory locations is stored on the machine carrying out the processing which generates the demand to read memory.

Similarly, all writing of memory locations or data is satisfied locally because a current value of all (or some subset of all) memory locations is stored on the machine carrying out the processing which generates the demand to write to memory.

Such local memory read and write processing operation can typically be satisfied within $10^2$-$10^3$ cycles of the central processing unit. Thus, in practice there is substantially less waiting for memory accesses which involves and/or writes. Also, the local memory of each machine is not able to be accessed by any other machine and can therefore be said to be independent.

The invention is transport, network, and communications path independent, and does not depend on how the communication between machines or DRTs takes place. In one embodiment, even electronic mail (email) exchanges between machines or DRTs may suffice for the communications.

In connection with the above, it will be seen from FIG. 2 that there are a number of machines M1, M2, . . . Mn, "n" being an integer greater than or equal to two, on which the application program 50 of FIG. 1A is being run substantially simultaneously. These machines are allocated a number 1, 2, 3, . . . etc. in a hierarchical order. This order is normally looped or closed so that whilst machines 2 and 3 are hierarchically adjacent, so too are machines "n" and 1. There is preferably a further machine X which is provided to enable various housekeeping functions to be carried out, such as acting as a lock server. In particular, the further machine X can be a low value machine, and much less expensive than the other machines which can have desirable attributes such as processor speed. Furthermore, an additional low value machine (X+1) is preferably available to provide redundancy in case machine X should fail. Where two such server machines X and X+1 are provided, they are preferably, for reasons of simplicity, operated as dual machines in a cluster configuration. Machines X and X+1 could be operated as a multiple computer system in accordance with the present invention, if desired. However this would result in generally undesirable complexity. If the machine X is not provided then its functions, such as housekeeping functions, are provided by one, or some, or all of the other machines.

Figure 3:
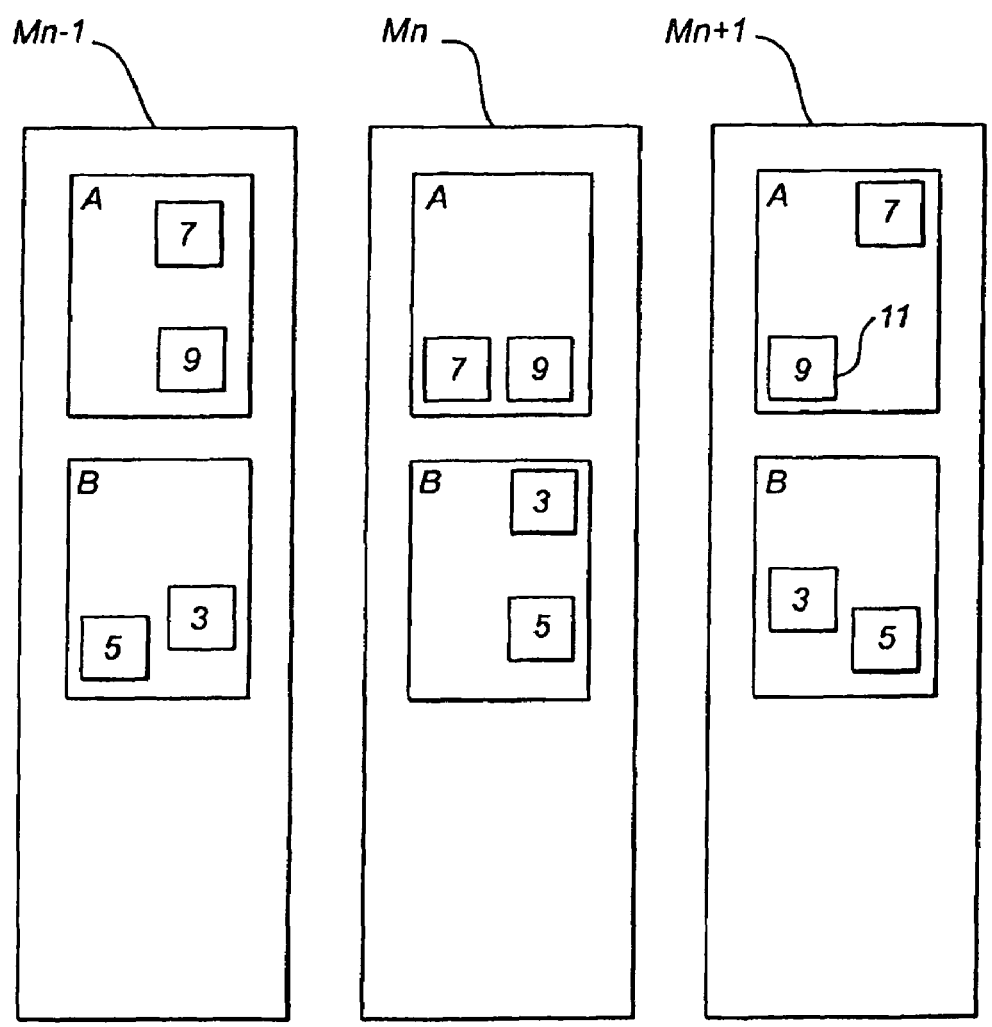
FIG. 3 is a schematic map of the memory locations in the multiple machines showing memory locations including objects and fields.

Turning now to FIG. 3, this drawing illustrates the memory map for any three machines Mn−1, Mn and Mn+1 of the multiple machines making up the computer system. The initialisation process described in the above incorporated patent specification has been carried prior to the commencement of operation of the application program and thus the memory contents of each of the machines is essentially identical. In the particular example illustrated, each machine has two objects A and B and each object has two primitive fields 11 which are capable of storing alphanumeric data. In the particular example given, the two fields of object A contain the numerals 7 and 9 whilst the two fields of object B contain the numerals 3 and 5.

After being initialised as described above, each of the individual computers executes different portions of the application program 5. It is to be expected that each machine will generate only revised data to be stored in both primitive and non-primitive fields. Where such fields are primitive fields which contain only alphanumeric data, these fields are able to be easily copied and thereby replicated on each of the other machines. However, as indicated in FIG. 4, the situation can arise where, say, machine Mn has a reference field 10 which because it is different from the primitive fields 11 is indicated with a double line border.

Inside object A in machine Mn are fields 10, 11 and 12 which have corresponding fields 30, 31 and 32 in object A in machine Mn−1, and corresponding fields 20, 21 and 22 in object A in machine Mn+1.

In this particular example, the new reference field 10 contains a reference to an additional object H which itself includes two primitive fields 11. In FIG. 4, within the reference field 10 are indicated both the name H of the object being referenced and also an arrow to indicate that the contents of the reference field 10 re-directs the program to move from object A to object H. The problem therefore arises as to how to replicate the memory changes which have occurred in machine Mn in all the other machines so as to enable the computer system to maintain a substantially coherent memory.

Figure 4:
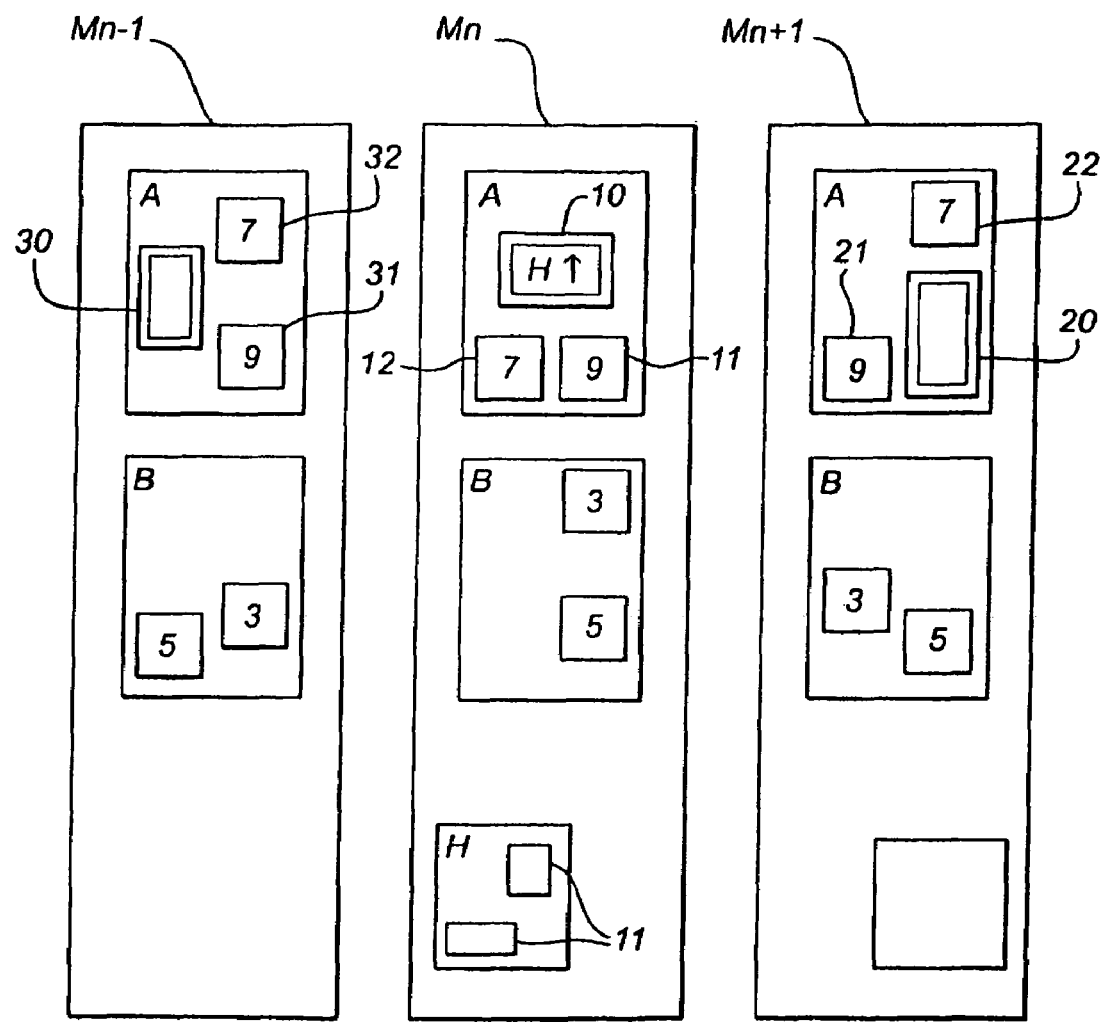
FIG. 4 is a memory map similar to FIG. 3 but showing the creation of a reference field which makes reference to a new object.

As indicated in FIG. 4, in relation to machine Mn−1, it would be possible to have a reference field 30 within the object A, however, this is insufficient since the object H to which the reference field 10 of machine Mn refers, is not present in machine Mn−1. Alternatively, as indicated for machine Mn+1, it would be possible to have both a reference field 20 within the object A and also create a new object within the machine, however, the machine organisations are different in general and thus the pointer (or address) of the new object created in machine Mn+1 is not the same as the pointer (or address) of the object H created in machine Mn.

Figure 5:
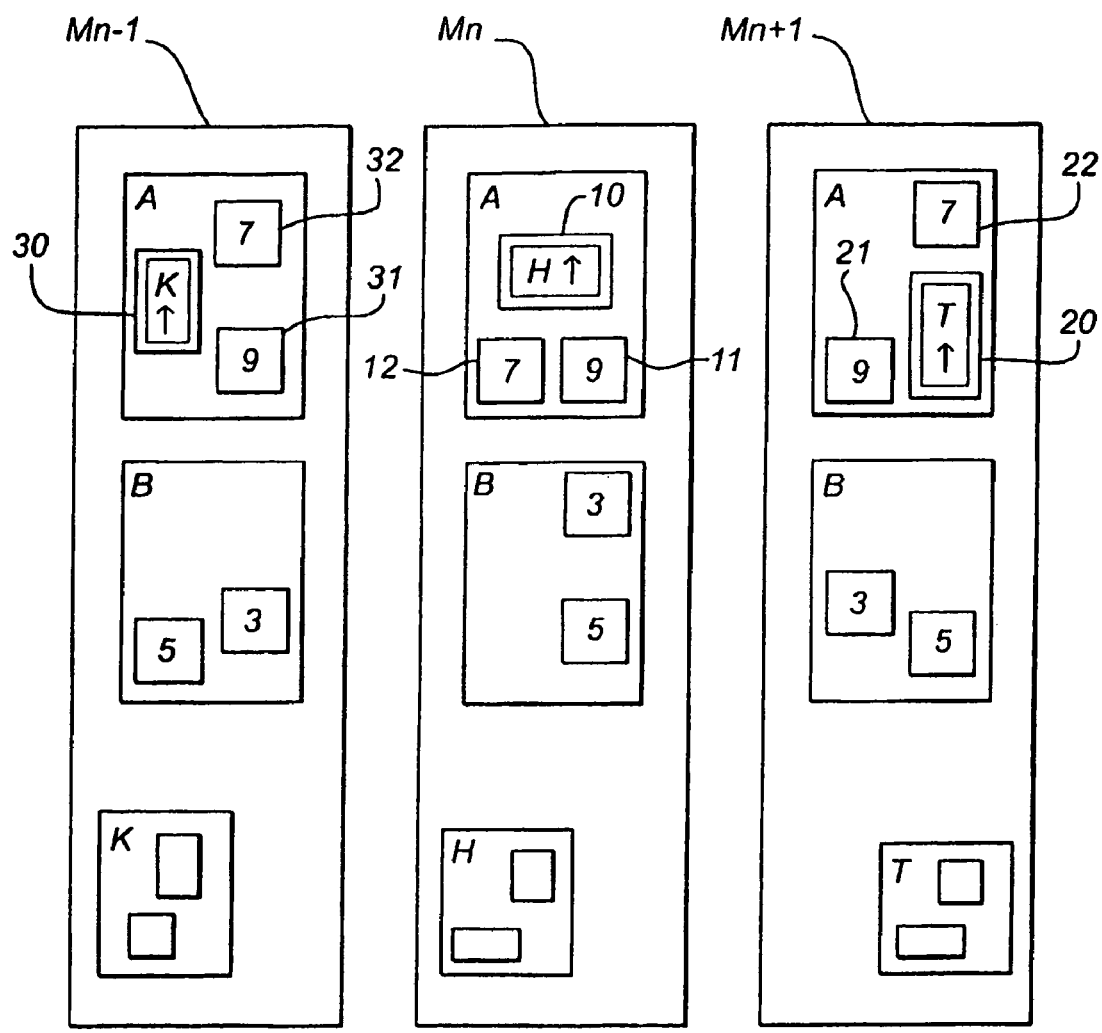
FIG. 5 is a memory map showing the successful replication of the newly created reference field.

The desired final result is illustrated in FIG. 5. Here the machine Mn which had the reference field 10 and the additional object H are as before. However, for the machine Mn+1 the object A is provided with a reference field 20 the contents of which refer to a new object T which has been created in the local memory of machine Mn+1 and which corresponds to the object H of machine N. Similarly, machine Mn−1 has for object A a reference field 30 which corresponds to field 10 and the contents of which refer to a new object K which has been created within the local memory of machine Mn−1 and which corresponds the object H of machine Mn.

The desired outcome illustrated in FIG. 5 is created using a concordance table such as that illustrated in FIG. 6. Such a concordance table is preferably and conveniently stored within the server machine X and is therefore accessible by all other machines. In the concordance table of FIG. 6 the creation of the referenced object H (which for the purposes of this example may conveniently be assumed to relate to an aspect of the application program 50 regarding a human head, is allocated a global name C (conveniently standing for cranium meaning head in Latin)), it being understood that the local pointer (or address) of H will in general be different from the global name C.

For each of the other machines in the multiple computer system, it is necessary to create a local pointer (or address) for the new object which is then entered into the concordance table of FIG. 6 corresponding to the global name C. For the machine Mn−1, the local address of the new object is conveniently referred to as K (standing for Kopf meaning head in German) whilst for machine Mn+1, the local address is conveniently T (standing for tête, meaning head in French).

Because the objects H, T and K are all linked via the concordance table of FIG. 6, the contents of the individual primitive fields in object H can be easily copied across to the corresponding primitive fields in the objects K and T respectively.

Figure 7:
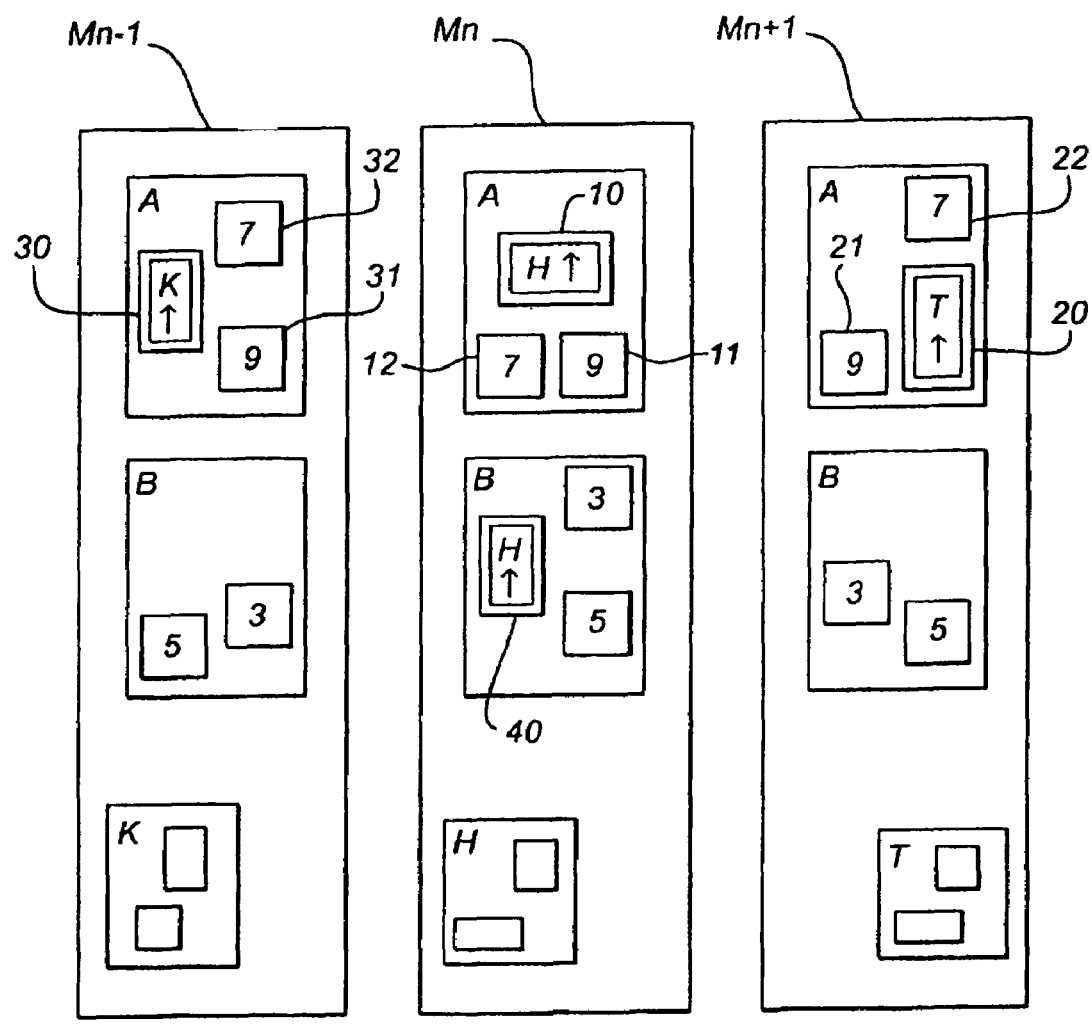
FIG. 7 is a memory map showing the creation of a still further reference field.

Turning now to FIG. 7, a slightly different occurrence is indicated. Here the processing of the application program 50 being carried out by machine Mn generates within object B a new reference field 46 which refers to the existing object H. It is therefore necessary to create a local copy of the reference field 46 in the corresponding objects B contained in machines Mn−1 and Mn+1.

Figure 8:
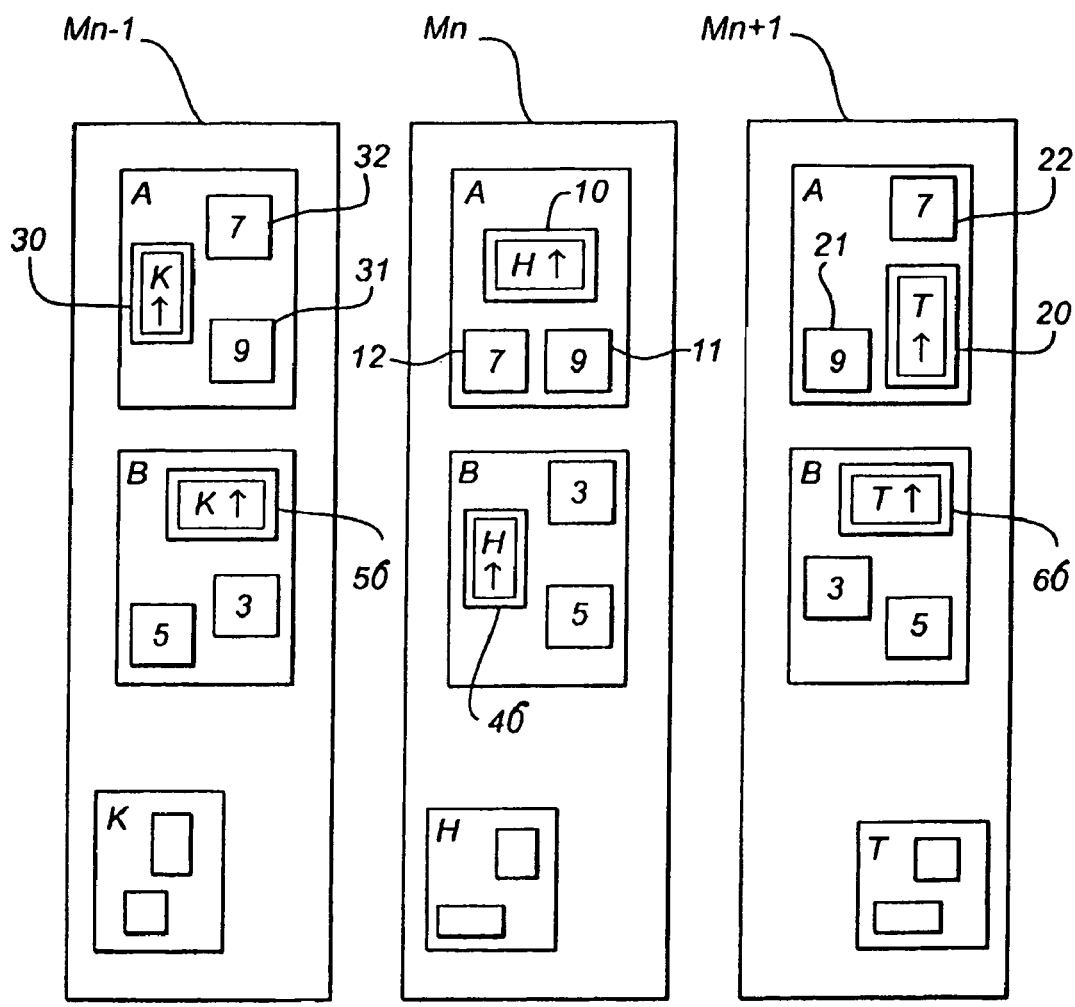
FIG. 8 is a memory map showing the successful replication of the further reference field.

The end result is as illustrated in FIG. 8 where the new reference fields 56 and 66 have been created in machines Mn−1 and Mn+1 respectively. Furthermore, the content of each of these new reference fields is a reference to the objects, K and T respectively, which correspond to the object H of the machine Mn. This creation is possible by consulting the concordance table of FIG. 6 so that machine Mn+1, for example, knows that the object in its local memory corresponding to object H of machine Mn is the object T.

Figure 9:
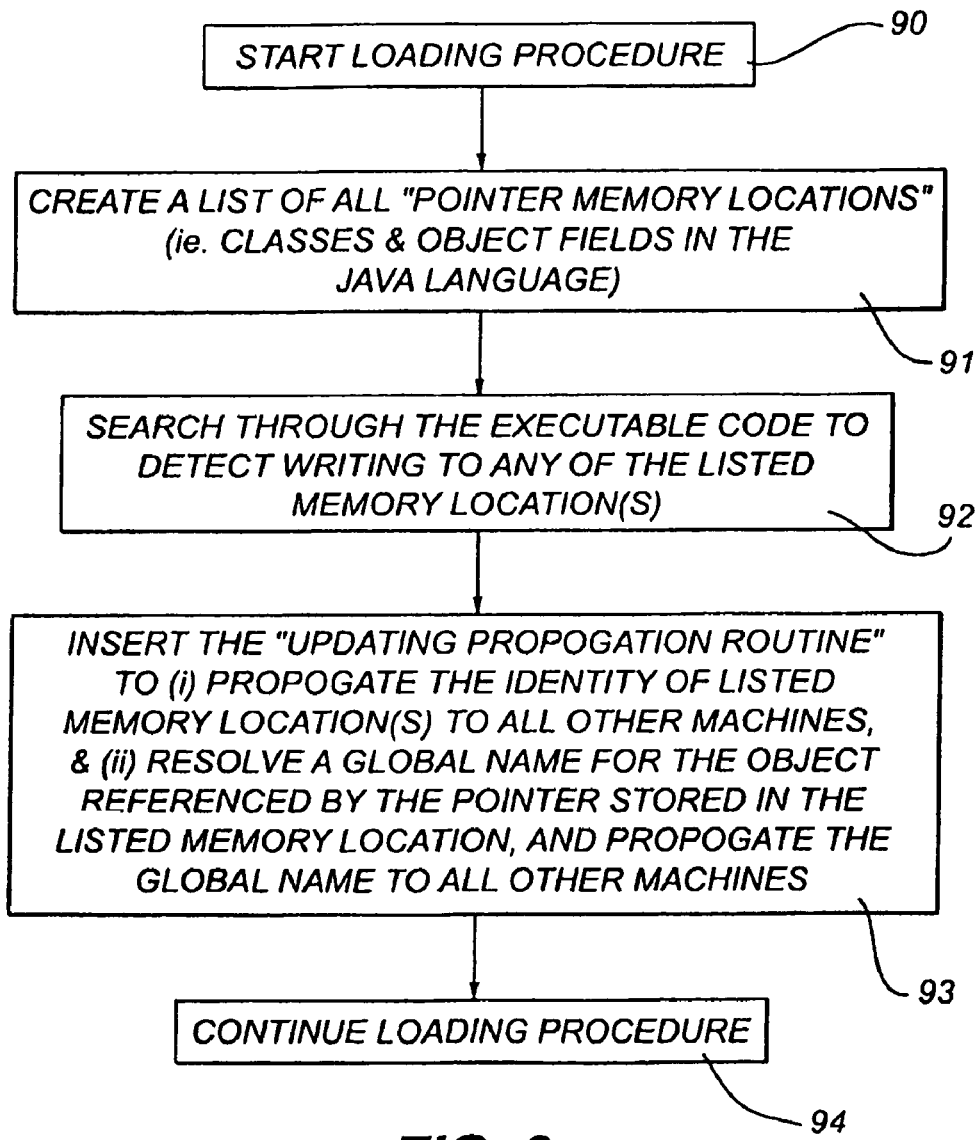
FIG. 9 is a flow chart of the procedure followed during loading of the same application on each machine in the network.

Turning now to FIG. 9, during the initial loading procedure, the program 50 being loaded to create each JAVA virtual machine 72 is modified. This modification commences at step 90 in FIG. 9 and involves the initial substantive step 91 of detecting all memory locations (termed fields in JAVA—but equivalent terms are used in other languages) in the application 50 being loaded. Such memory locations need to be identified for subsequent processing at steps 92 and 93. The DRT 71 during the loading procedure creates a list of all the memory locations thus identified, the JAVA fields being listed by object and class. Both volatile and synchronous fields are listed.

The next phase (designated step 92 in FIG. 9) of the modification procedure is to search through the executable application code in order to locate every processing activity that manipulates or changes field values corresponding to the list generated at step 91 and thus writes to fields so the value at the corresponding memory location is changed. When such an operation (typically putstatic or putfield in the JAVA language) is detected which changes the field value, then an "updating propagation routine" is inserted by step 93 at this place in the program to ensure that all other machines are notified that the content of the field has changed. Thereafter, the loading procedure continues in a normal way as described in the abovementioned incorporated specifications and as indicated by step 94 in FIG. 9.

Figure 10:
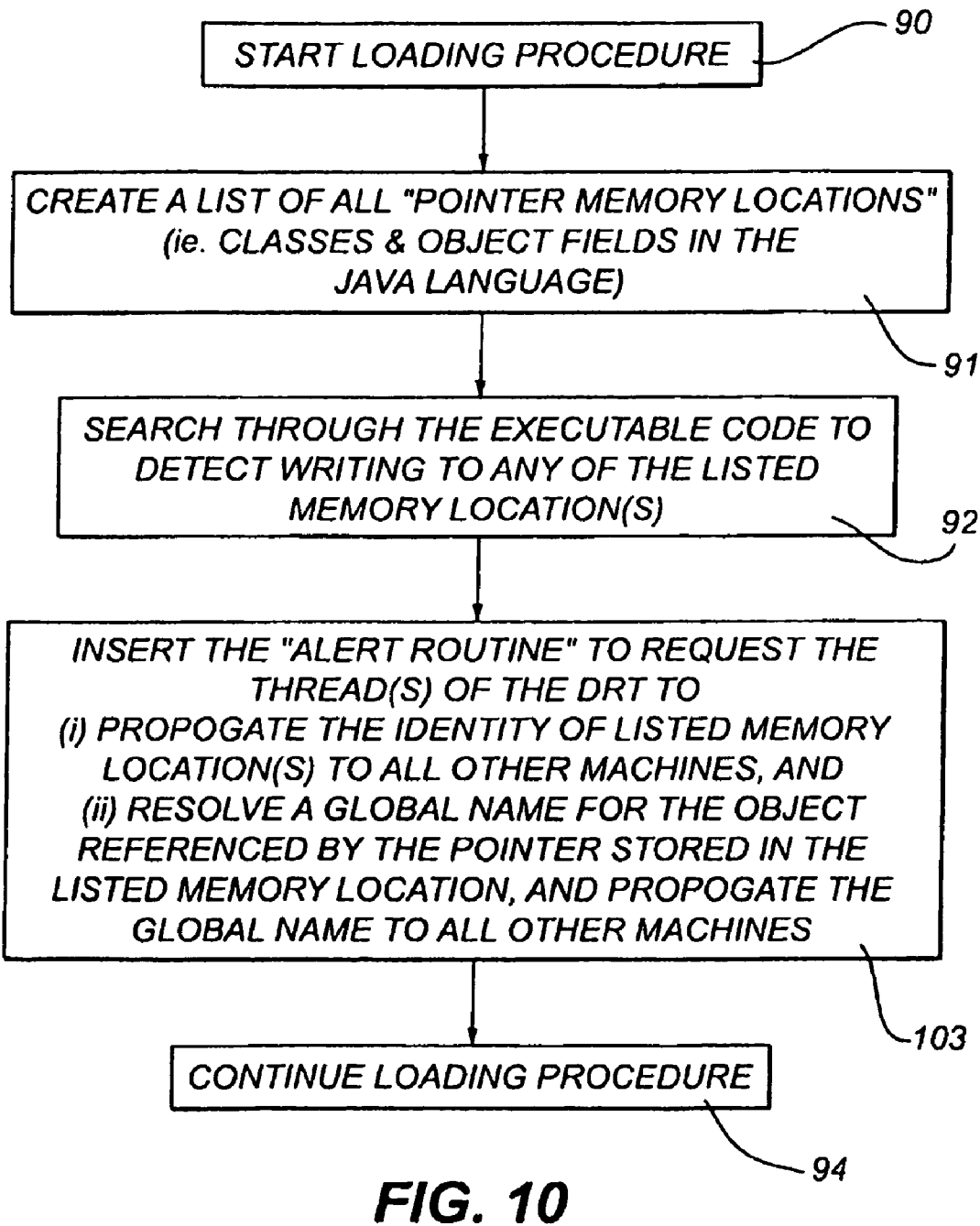
FIG. 10 is a flow chart showing a modified procedure similar to that of FIG. 9.

An alternative form of initial modification during loading is illustrated in FIG. 10. Here the start and listing steps 90 and 91 and the searching step 92 are the same as in FIG. 9. However, rather than insert the "updating propagation routine" as in step 93 in which the processing thread carries out the updating, instead an "alert routine" is inserted at step 103. The "alert routine" instructs a thread or threads not used in processing and allocated to the DRT, to carry out the necessary propagation. This step 103 is a quicker alternative to step 93 of FIG. 9 and one which results in lower overhead.

Figure 11:
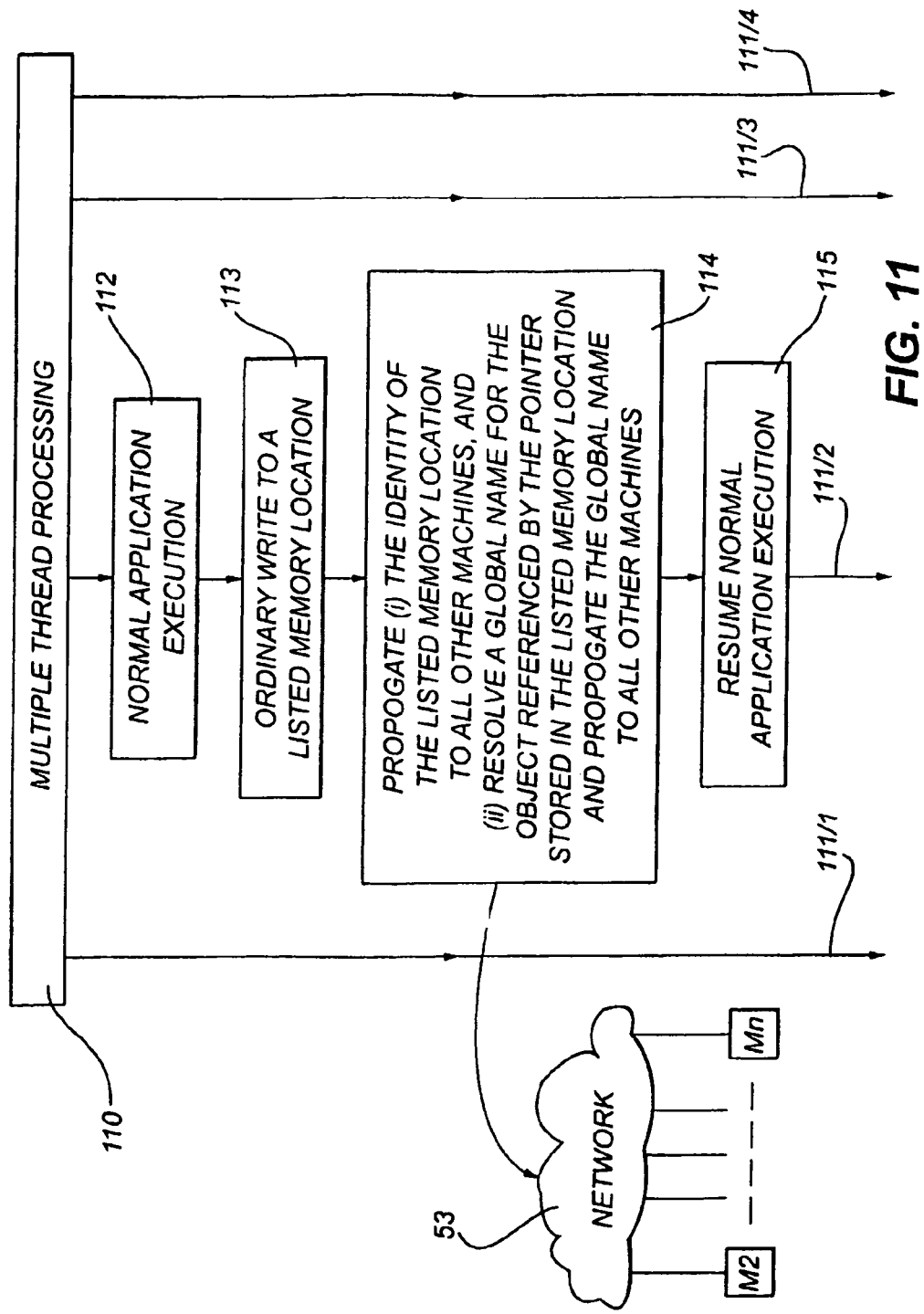
FIG. 11 is a schematic representation of multiple thread processing carried out on the machines of FIG. 8 utilizing a first embodiment of memory updating.
Figure 12:
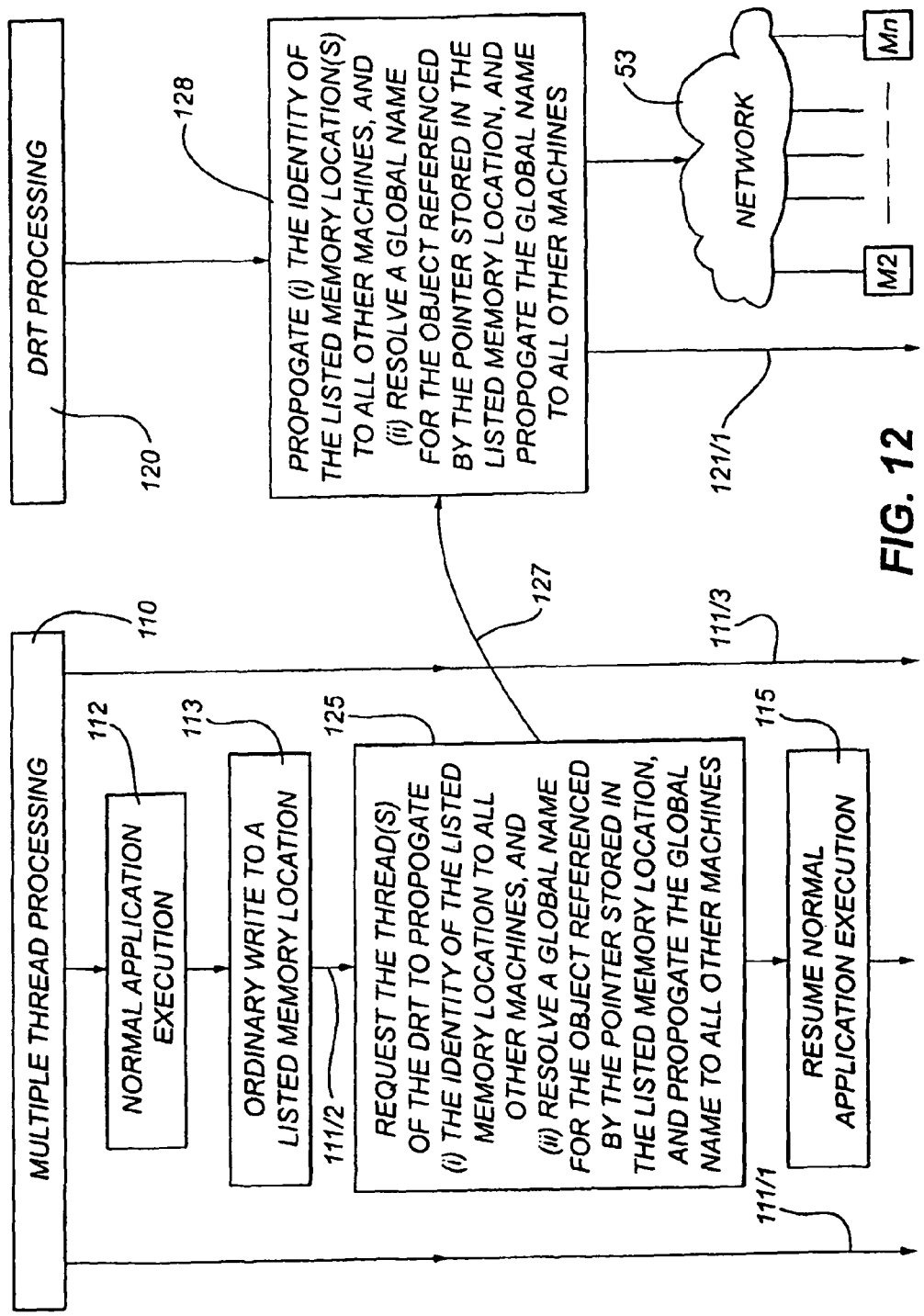
FIG. 12 is a schematic representation similar to FIG. 11 but illustrating an alternative embodiment.

Once this initial modification during the loading procedure as described in FIG. 9 or 10 has taken place, then either one of the multiple thread processing operations illustrated in FIGS. 11 and 12 takes place. As seen in the embodiment of FIG. 11, multiple thread processing 110 on machine M1 consisting of threads 111/1 . . . 111/4 is occurring and the processing of the second thread 111/2 (in this example) results in that thread 111/2 becoming aware at step 113 of a change of field value. At this stage the normal processing of that thread 111/2 is halted at step 114, and the same thread 111/2 notifies all other machines M2 . . . Mn via the network 53 of the identity of the changed field and the changed content which occurred at step 113. At the end of that communication procedure, the thread 111/2 then resumes the processing at step 115 until the next instance where there is a change of field content.

In the alternative arrangement illustrated in FIG. 12, once a thread 111/2 on machine M1 has become aware of a change of field value at step 113, it instructs DRT processing 120 (as indicated by step 125 and arrow 127) that another thread(s) 121/1 allocated to the DRT processing 120 is to propagate in accordance with step 128 via the network 53 to all other machines M2 . . . Mn the identity of the changed field and the changed content detected at step 113. This is an operation which can be carried out quickly and thus the processing of the initial thread 111/2 is only interrupted momentarily as indicated in step 125 before the thread 111/2 resumes processing in step 115. The other thread 121/1 which has been notified of the change (as indicated by arrow 127) then communicates that change as indicated in step 128 via the network 53 to each of the other machines M2 . . . Mn.

This second arrangement of FIG. 12 makes better utilisation of the processing power of the various threads 111/1 . . . 111/3 and 121/1 (which are not, in general, subject to equal demands) and gives better scaling with increasing size of "n", (n being an integer greater than or equal to 2 which represents the total number of machines which are connected to the network 53 and which each execute a different portion of the application program 50 simultaneously). Irrespective of which arrangement is used, the changed field and identities and contents detected at step 113 are propagated to all the other machines M2 . . . Mn on the network.

Figure 13:
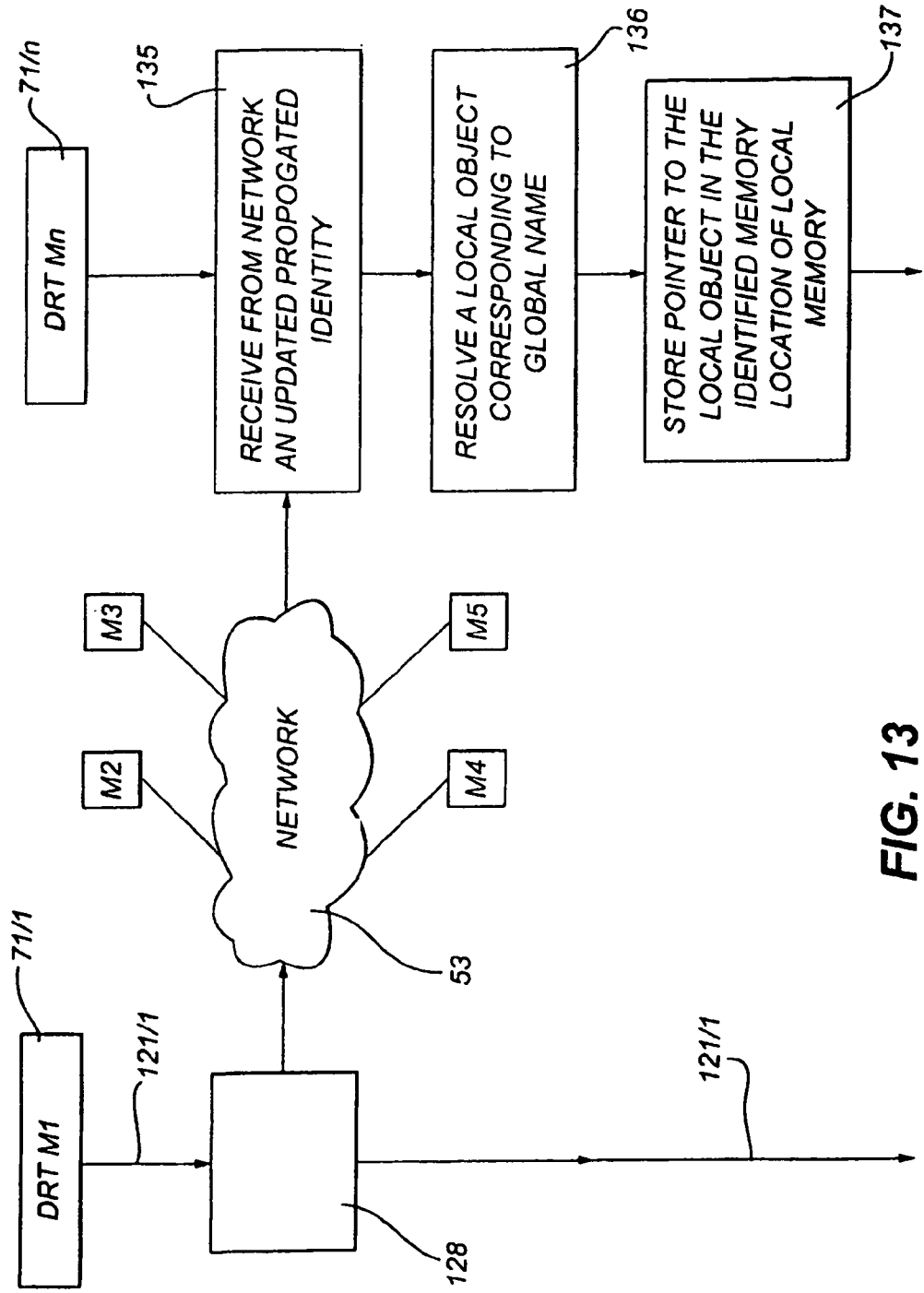
FIG. 13 illustrates multi-thread memory updating for the computers of FIG. 8.

This is illustrated in FIG. 13 where the DRT 71/1 and its thread 121/1 of FIG. 12 (represented by step 128 in FIG. 13) sends via the network 53 the identity and changed content of the listed memory location generated at step 113 of FIG. 12 by processing in machine M1, to each of the other machines M2 . . . Mn.

Each of the other machines M2 . . . Mn carries out the action indicated by steps 135, 136, and 137 in FIG. 13 for machine Mn by receiving the identity and content pair from the network 53 and writing the new content into the local corresponding memory location.

It will be apparent to those skilled in the computing arts that the concordance table of FIG. 6 is not necessarily only able to be positioned within a server machine X. Instead, a local copy of the table can be maintained in each of the individual machines Mn−1, Mn, Mn+1, etc. In addition, under these circumstances it is not necessary for there to be a global name since each machine is able, by consulting its own table, to determine the object in local memory which corresponds to the object being referred to by any other machine. For example, if machine Mn receives a message from machine Mn+1 to update the contents of a primitive field 11 contained in object T, machine Mn consults the concordance table of FIG. 6 and determines that its object H corresponds to the object T of machine Mn+1 and therefore that is the object which should be updated. That is, the concordance table of FIG. 6 need not include the left hand column entitled "GLOBAL". For this reason the table illustrated in FIG. 6 has the left hand portion separated by broken lines to indicate it is not required if no server machine X is present.

The foregoing describes only some embodiments of the present invention and modifications, obvious to those skilled in the computing arts, can be made thereto without departing from the scope of the present invention.

For example, the above described arrangements envisage "n" computers each of which shares a fraction (1/n th) of the application program. Under such circumstances all "n" computers have the same local memory structure. However, it is possible to operate such a system in which a subset only of the computers has the same local memory structure. Under this scenario, the maximum number of members of the subset is to be regarded as "n" the in the description above.

It is also to be understood that the memory locations can include both data and also portions of code. Thus the new values or changes made to the memory locations can include both new numerical data and new or revised portions of code. Similarly, reference to JAVA includes both the JAVA language and also JAVA platform and architecture.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 . . . Mn. For example, rather than having to keep track of each unique local name or identity of each similar equivalent local object on each machine of the plurality of similar equivalent objects, one may instead define or use a global name corresponding to the plurality of similar equivalent objects on each machine (e.g. "globalname7787"), and with the understanding that each machine relates the global name to a specific local name or object (e.g. "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (e.g. memory locations or fields), for each such recorded object on each machine M1, M2 . . . Mn there is a name or identity which is common or similar on each of the machines M1, M2 . . . Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

The term "table" or "tabulation" as used herein is intended to embrace any list or organised data structure of whatever format and within which data can be stored and read out in an ordered fashion.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:
 (i) re-compilation at loading,
 (ii) a pre-compilation procedure prior to loading,
 (iii) compilation prior to loading,
 (iv) "just-in-time" compilation(s), or
 (v) re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Given the fundamental concept of modifying memory manipulation operations to coordinate operation between and amongst a plurality of machines M1, M2 . . . Mn, there are several different ways or embodiments in which this coordinated, coherent and consistent memory state and manipulation operation concept, method, and procedure may be carried out or implemented.

In the first embodiment, a particular machine, say machine M2, loads the asset (such as class or object) inclusive of memory manipulation operation(s), modifies it, and then loads each of the other machines M1, M3 . . . Mn (either sequentially or simultaneously or according to any other order, routine or procedure) with the modified object (or class or other assert or resource) inclusive of the new modified memory manipulation operation. Note that there may be one or a plurality of memory manipulation operations corresponding to only one object in the application code, or there may be a plurality of memory manipulation operations corresponding to a plurality of objects in the application code. Note that in one embodiment, the memory manipulation operation(s) that is (are) loaded is executable intermediary code.

In this arrangement, which may be termed "master/slave" each of the slave (or secondary) machines M1, M3 . . . Mn loads the modified object (or class), and inclusive of the new modified memory manipulation operation(s), that was sent to it over the computer communications network or other communications link or path by the master (or primary) machine, such as machine M2, or some other machine as a machine X. In a slight variation of this "master/slave" or "primary/secondary" arrangement, the computer communications network can be replaced by a shared storage device such as a shared file system, or a shared document/file repository such as a shared database.

It will be appreciated in the light of the detailed description provided herein that the modification performed on each machine or computer need not and frequently will not be the same or identical. What is required is that they are modified in a similar enough way that each of the plurality of machines behaves consistently and coherently relative to the other machines. Furthermore, it will be appreciated that there are a myriad of ways to implement the modifications that may for example depend on the particular hardware, architecture, operating system, application program code, or the like or different factors. It will also be appreciated that implementation can be within an operating system, outside of or without the benefit of any operating system, inside the virtual machine, in an EPROM, in software, in hardware, in firmware, or in any combination of these.

In a still further embodiment, each machine M1, M2 . . . Mn receives the unmodified asset (such as class or object) inclusive of one or more memory manipulation operation(s), but modifies the operations and then loads the asset (such as class or object) consisting of the now modified operations. Although one machine, such as the master or primary machine may customize or perform a different modification to the memory manipulation operation(s) sent to each machine, this embodiment more readily enables the modification carried out by each machine to be slightly different. It can thereby be enhanced, customized, and/or optimized based upon its particular machine architecture, hardware processor, memory, configuration, operating system, or other factors yet still be similar, coherent and consistent with the other machines and with all other similar modifications.

In all of the described instances or embodiments, the supply or the communication of the asset code (such as class code or object code) to the machines M1, M2 . . . Mn and optionally inclusive of a machine X, can be branched, distributed or communication among and between the different machines in any combination or permutation; such as by providing direct machine to machine communication (for example, M2 supplies each of M1, M3, M4 etc. directly), or by providing or using cascaded or sequential communication (for example, M2 supplies M1 which then supplies M3 which then supplies M4, and so on) or a combination of the direct and cascaded and/or sequential.

The above described arrangement needs to be varied in the situation where the modification relates to a cleanup routine, finalization or similar, which is only to be carried out by one of the plurality of computers In this variation of this "master/slave" or "primary/secondary" arrangement, machine M2 loads the asset (such as class or object) inclusive of a cleanup routine in unmodified form on machine M2, and then (for example, M2 or each local machine) deletes the unmodified cleanup routine that had been present on the machine in whole or part from the asset (such as class or object) and loads by means of the computer communications network the modified code for the asset with the now modified or deleted cleanup routine on the other machines. Thus in this instance the modification is not a transformation, instrumentation, translation or compilation of the asset cleanup routine but a deletion of the cleanup routine on all machines except one. In one embodiment, the actual code-block of the finalization or cleanup routine is deleted on all machines except one, and this last machine therefore is the only machine that can execute the finalization routine because all other machines have deleted the finalization routine. One benefit of this approach is that no conflict arises between multiple machines executing the same finalization routine because only one machine has the routine.

The process of deleting the cleanup routine in its entirety can either be performed by the "master" machine (such as for example machine M2 or some other machine such as machine X) or alternatively by each other machine M1, M3 . . . Mn upon receipt of the unmodified asset. An additional variation of this "master/slave" or "primary/secondary" arrangement is to use a shared storage device such as a shared file system, or a shared document/file repository such as a shared database as means of exchanging the code for the asset, class or object between machines M1, M2 . . . Mn and optionally the server machine X.

In a further arrangement, a particular machine, say for example machine M1, loads the unmodified asset (such as class or object) inclusive of a finalization or cleanup routine and all the other machines M2, M3 . . . Mn perform a modification to delete the cleanup routine of the asset (such as class or object) and load the modified version.

In a still further arrangement, the machines M1, M2 . . . Mn, may send some or all load requests to the additional server machine X, which performs the modification to the application program code 50 (including or consisting of assets, and/or classes, and/or objects) and inclusive of finalization or cleanup routine(s), via any of the abovementioned methods, and returns in the modified application program code inclusive of the now modified finalization or cleanup routine(s) to each of the machines M1 to Mn, and these machines in turn load the modified application program code inclusive of the modified routine(s) locally. In this arrangement, machines M1 to Mn forward all load requests to machine X, which returns a modified application program code inclusive of modified finalization or cleanup routine(s) to each machine. The modifications performed by machine X can include any of the modifications described. This arrangement may of course be applied to some only of the machines whilst other arrangements described herein are applied to others of the machines.

Those skilled in the computer and/or programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are properly handled or catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated languages) to JAVA including Microsoft.NET platform and architecture (Visual Basic, Visual C/C++, and C#) FORTRAN, C/C++, COBOL, BASIC etc.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to lock means, distributed run time means, modifier or modifying means, and the like. In at least one embodiment of the invention, any one or each of these various means may be implemented by computer program code statements or instructions (possibly including by a plurality of computer program code statements or instructions) that execute within computer logic circuits, processors, ASICs, logic or electronic circuit hardware, microprocessors, microcontrollers or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by a combination of computer program software, firmware, and/or hardware.

Any and each of the above described methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer in which it executes or on a computer coupled with, connected to, or otherwise in signal communications with the computer on which the computer program or computer program product is present or executing. Such a computer program or computer program product modifies the operation and architectural structure of the computer, computing machine, and/or information appliance to alter the technical operation of the computer and realize the technical effects described herein.

The invention may therefore include a computer program product comprising a set of program instructions stored in a storage medium or existing electronically in any form and operable to permit a plurality of computers to carry out any of the methods, procedures, routines, or the like as described herein including in any of the claims.

Furthermore, the invention includes (but is not limited to) a plurality of computers, or a single computer adapted to interact with a plurality of computers, interconnected via a communication network or other communications link or path and each operable to substantially simultaneously or concurrently execute the same or a different portion of an application code written to operate on only a single computer on a corresponding different one of computers. The computers are programmed to carry out any of the methods, procedures, or routines described in the specification or set forth in any of the claims, on being loaded with a computer program product or upon subsequent instruction. Similarly, the invention also includes within its scope a single computer arranged to co-operate with like, or substantially similar, computers to form a multiple computer system To summarise, there is disclosed a method of replicating non-primitive fields of duplicated objects in a multiple computer environment in which different portions of at least one application program execute simultaneously on different ones of multiple computers interconnected via a communications network, the method of comprising the steps of:

(i) creating a concordance table and for each object present in any one of the multiple computers making the entries in the concordance table correspond to each reference to the object, (ii) replicating the concordance table in each computer or allowing each computer to access a corresponding portion of a single concordance table for all machines present in a server computer, each the entry in the concordance table containing a local pointer to the local memory object referenced by the object of the one machine, and (iii) having each the other machine designate a corresponding non-primitive field and local object and entering the corresponding local pointer of the corresponding local memory object in the table or tables.

Preferably included is the further step of:

(iv) utilizing a global name in the table(s) corresponding to all local pointers of corresponding non-primitive fields or corresponding objects.

Preferably included is the further step of:

(v) where processing of one of the application program portions dictates the creation of a second or subsequent referenced non-primitive field in one of the machines, creating a corresponding second or subsequent referenced non-primitive field in each of the other ones of the machines.

Preferably included are the further steps of:

(vi) executing the different portions of the application program utilizing one of multiple threads within each the computer, and (vii) having the thread which dictates the creation of the second or subsequent referenced non-primitive field, instruct each of the other ones of the computers to create the corresponding second or subsequent referenced non-primitive field.

Preferably included are the further steps of:

(viii) executing the different portions of the application program utilizing one of multiple threads within each the computer, and (ix) having a different thread from the thread which dictates the creation of the second or subsequent referenced non-primitive field, instruct each of the other ones of the computers to create the corresponding second or subsequent referenced non-primitive field.

In addition, there is disclosed a multiple computer system in which different portions of at least one application program execute simultaneously on different ones of the multiple computers which are interconnected via a communications network, wherein for each non-primitive field created in any one of the computers there is a corresponding entry in a concordance table accessible by all the computers or replicated in each the computer, the table entry containing a local pointer to the local memory object referenced by the non-primitive field of the one computer, and wherein each other the computer designates a corresponding non-primitive field and local object and the corresponding local pointer of the corresponding local memory object is entered in the concordance table or tables.

Preferably the table or tables utilize a global name corresponding to all local pointers of corresponding non-primitive fields or corresponding objects.

Preferably for each second or subsequent referenced non-primitive field in one of the computers, a corresponding second or subsequent referenced non-primitive field is created in each of the other ones of the computers.

Preferably multiple thread processing is utilized in each the computer to execute a different portion of the application program, and the thread which dictates the creation of the second or subsequent referenced non-primitive field, instructs each of the other ones of the computers to create the second or subsequent referenced non-primitive field.

Alternatively, multiple thread processing is utilized in each the computer to execute a different portion of the application program, and a different thread from the thread which dictates the creation of the second or subsequent referenced non-primitive field, instructs each of the other ones of the computers to create the second or subsequent referenced non-primitive field.

There is also provided a plurality of computers interconnected via a communications network and operable to ensure carrying out of any of the above method(s).

There is further provided a computer program product comprising a set of program instructions stored in a storage medium and operable to permit a plurality of computers to carry out any of the above method(s).

Also disclosed is a single computer adapted to co-operate with at least one other computer in order to carry out any of the above method(s) or form the abovementioned computer system.

The term "comprising" (and its grammatical variations) as used herein is used in the inclusive sense of "having" or "including" and not in the exclusive sense of "consisting only of".

The invention claimed is:

1. In a multiple computer system comprising a plurality of computers, each including a local processor and a local memory coupled with the local processor, and including a first computer and a second computer interconnected via a communications link or network operating in a replicated shared memory arrangement, each of the local memories having a local memory location and/or a memory value, a method of classifying said local memories comprising:

classifying said local memories into a first category of memory locations each of which contains or stores non-address values or content;

classifying said local memories into a second category of memory locations each of which contains or stores memory address values or memory address contents of other memory location(s), wherein said plural replica memory locations comprises a plurality of replicated memory locations and/or values, each on a different one of said multiple computers, and which are updated with new values or content, and where said updating includes identifying the corresponding said ones of said plural replicated memory locations on each one of said multiple computers which are to be updated, wherein said replicated memory locations are said second category memory locations, and where said new value(s) or content are said memory address value(s), and receiving said new value(s) transmitted by another one of said multiple computers, and where following utilizing said correspondence to determine or resolve the local memory address value(s) on each one of said multiple computers to which said new value(s) correspond, wherein, if it is determined that a corresponding memory location for said memory address value(s) is not replicated on one or more of said multiple computers, the method further comprising:
(a) replicating the said corresponding memory location(s) of said memory address value(s) to/in said one or more non-replicated computer(s); and
(b) storing said determined or resolved local memory address value(s) to said identified corresponding ones of plural replica memory locations, on each one of said multiple computers in which said corresponding memory location for said memory address value(s) is replicated; and if it is determined that no corresponding memory location for said memory address value(s) is replicated on one or more of said multiple computers, then including the steps of:
(c) replicating said corresponding memory location(s) of said memory address value(s) to/in said one or more non-replicating computer(s) in which said replica memory location(s) is replicated, and
(d) storing said determined or resolved local memory address value(s) to said identified corresponding ones of plural replica memory locations, on each one of said multiple computers in which said corresponding memory location for said memory address value(s) is replicated.

2. A method as in claim 1, further comprising:
a. maintaining a correspondence of or between ones of plural replica memory locations, where said ones of said plural replica memory locations are each on a different one of said multiple computers.

3. A method as in claim 1, further comprising:
a. maintaining a correspondence of or between ones of plural replica memory locations, said correspondence on each one of said multiple computers, and where said ones of said plural replica memory locations are each on a different one of said multiple computers.

4. A method as in claim 1, further comprising:
a. maintaining a correspondence table or record of or between ones of plural replica memory locations, where said ones of said plural replica memory locations are each on a different one of said multiple computers.

5. A method as in claim 1, further comprising:
a. maintaining a correspondence table or record of or between ones of plural replica memory locations, said correspondence table or record being on each one of said multiple computers, and where said ones of said plural replica memory locations are each on a different one of said multiple computers.

6. A method as in claim 4, including the further step of:
maintaining one or multiple correspondence table or record according to at least one of the following predetermined schemes:
(i) maintaining one said correspondence table or record for all said multiple computers on a further a server;
(ii) maintaining one said correspondence table or record on in each of said multiple computers;
(iii) maintaining multiple said correspondence tables or records in each of said multiple computers;
(iv) maintaining multiple said correspondence tables or records, one of each said multiple tables or records in each of said computers;
(v) maintaining one said correspondence table or record for each said memory location;
(vi) maintaining one said correspondence table or record for each said first category memory location;
(vii) maintaining one said correspondence table or record for each said second category memory location;
(viii) maintaining one said correspondence table for each plurality of said memory location(s); and
(ix) maintaining one said correspondence table for each plurality of said memory locations of potentially multiple pluralities.

7. A method as in claim 4, further comprising:
a. maintaining one said correspondence table or record for all said multiple computers on a further server.

8. A method as in claim 4, including the further step of:
a. maintaining one said correspondence table or record on in each of said multiple computers.

9. A method as in claim 4, including the further step of:
a. maintaining multiple said correspondence tables or records in each of said multiple computers.

10. A method as in claim 4, including the further step of:
a. maintaining multiple said correspondence tables or records, one of each said multiple tables or records in each of said computers.

11. A method as in claim 4, including the further step of:
a. maintaining one said correspondence table or record for each said memory location.

12. A method as in claim 4, including the further step of:
a. maintaining one said correspondence table or record for each said first category memory location.

13. A method as in claim 4, including the further step of:
a. maintaining one said correspondence table or record for each said second category memory location.

14. A method as in claim 6, including the further step of:
a. maintaining one said correspondence table for each plurality of said memory location(s).

15. A method as in claim 14, including the further step of:
a. maintaining one said correspondence table for each plurality of said memory locations of potentially multiple pluralities.

16. A method as in claim 14, wherein said plurality of said memory locations are plural memory locations of a related set of memory locations.

17. A method as in claim 16, wherein said related set of memory locations is an array of memory locations.

18. A method as in claim 17, wherein said array of memory locations comprise an array data structure.

19. A method as in claim 16 wherein said related set of memory locations are memory locations of an object or class.

20. A method as in claim 19, wherein said memory locations of an object or class are object fields or variables, or class fields or variables.

21. A method as in claim 1, wherein said other memory location(s) includes said first category memory location(s).

22. A method as in claim 1, wherein said other memory location(s) includes said second category memory location(s).

23. A method as in claim 1, wherein said other memory location(s) includes said containing or storing second category memory location(s).

24. A method as in claim 1, wherein said memory address value(s) are memory addresses of said other memory location(s).

25. A method as in claim 1, wherein each of said memory address values comprise empty or null or invalid memory addresses.

26. A method as in claim 1, wherein said memory address value(s) are pointers, references, handles, or links to or of said other memory location(s).

27. A method as in claim 1, wherein each said correspondence is assigned or allocated or associated with a unique global name or identifier.

28. A method as in claim 1, wherein said each correspondence of said ones of said plural replica memory locations is assigned or allocated or associated with a global name or identifier.

29. A method as in claim 1, wherein: either (i) each said correspondence is assigned or allocated or associated with a unique global name or identifier, or (ii) said each correspondence of said ones of said plural replica memory locations is assigned or allocated or associated with a global name or identifier; and
wherein said correspondence comprises a recorded or indicated association of said ones of said plural replica memory locations.

30. A method as in claim 27, wherein said correspondence comprises a concordance table or record.

31. A method as in claims 1, wherein each said correspondence table or record is assigned or allocated or associated with a unique global name or identifier.

32. A method as in claim 1, wherein each said correspondence table or record of said ones of said plural replica memory locations is assigned or allocated or associated with a global name or identifier.

33. A method as in claim 1, wherein each entry of said correspondence table or record is assigned or allocated or associated with a unique global name or identifier.

34. A method as in claim 1, wherein each entry of said correspondence table or record of said ones of said plural replica memory locations is assigned or allocated or associated with a global name or identifier.

35. A method as in claim 27, wherein each said global name or identifier of each said correspondence is unique.

36. A method as in claim 1, including the further step of:
a. utilising said memory address value(s) to access said other memory location(s).

37. A method as in claim 1, including the further step of:
a. utilising said memory address value(s) to access said other memory location(s).

38. A method as in claim 35, wherein said access includes reading or writing said other memory location(s).

39. A method as in claim 35, wherein said access includes loading values or content from, or storing values or content to, said other memory location(s).

40. A method as in claim 39, wherein said utilisation includes utilising said memory address value(s) of said second category memory location(s) by said processing units.

41. A method as in claim 39, wherein said utilisation includes utilising said memory address value(s) of said second category memory location(s) by said application program.

42. A method as in claim 41, wherein said application program includes executable instructions or executable code of said application program.

43. A method as in claim 40, wherein said replica memory locations are said first category memory location(s), and where said new value(s) or content are said non-address value(s) or content, including the further step of:
a. receiving said new value(s) previously transmitted by another one of said multiple computers,
b. storing said received new value(s) or content to said identified corresponding ones of plural replica memory locations, on each receiving one of said computer(s).

44. A method as in claim 40, wherein said replica memory locations are said second category memory location(s), and where said new value(s) or content are said empty or null or invalid memory address value(s), including the further step of:
a. receiving said new value(s) previously transmitted by another one of said multiple computers,
b. storing an empty or null or invalid memory address value or content to said identified corresponding ones of plural replica memory locations, on each receiving one of said computer(s).

45. A method as in claim 40, wherein said replica memory locations are said second category memory locations, and where said new value(s) or content are said memory address value(s), including the further step of:
a. receiving said new value(s) previously transmitted by another one of said multiple computers,
b. utilising said correspondence to determine (or resolve) the local memory address value(s) on each one of said computers to which said received new value(s) correspond,
c. storing said determined (or resolved) local memory address value(s) to said identified corresponding ones of plural replica memory locations, on each receiving one of said computer(s).

46. A method as in claim 40, wherein said replica memory locations are said second category memory locations, and where said new value(s) or content is/are said global name(s) or identifier(s), including the further step of:
a. receiving said new value(s) previously transmitted by another one of said multiple computers,
b. utilising said correspondence to determine (or resolve) the local memory address value(s) on each one of said computers to which said received new value(s) correspond,
c. storing said determined (or resolved) local memory address value(s) to said identified corresponding ones of plural replica memory locations, on each receiving one of said computer(s).

47. A method as in claim 1, wherein said replica memory locations comprise said second category memory locations, and where said new value(s) or content are said memory address value(s), and receiving said new value(s) transmitted by another one of said multiple computers, and where following utilizing said correspondence to determine or resolve the local memory address value(s) on each one of said multiple computers to which said new value(s) correspond, it is determined that a corresponding memory location for said memory address value(s) is not replicated on one or more of said multiple computers, then including the step of:
a. replicating the said corresponding memory location(s) of said memory address value(s) to/in said one or more non-replicated computer(s); and
b. storing said determined or resolved local memory address value(s) to said identified corresponding ones of plural replica memory locations, on each one of said multiple computers in which said corresponding memory location for said memory address value(s) is replicated.

48. A method as in claim 1, wherein said replica memory locations are said second category memory locations, and where said new value(s) or content are said memory address value(s), and receiving said new value(s) transmitted by another one of said multiple computers, and where following utilizing said correspondence to determine or resolve the local memory address value(s) on each one of said multiple computers to which said new value(s) correspond, it is determined that no corresponding memory location for said memory address value(s) is replicated on one or more of said multiple computers, then including the step of:
  a. replicating the said corresponding memory location(s) of said memory address value(s) to/in said one or more non-replicating computer(s) in which said replica memory location(s) is replicated; and
  b. storing said determined or resolved local memory address value(s) to said identified corresponding ones of plural replica memory locations, on each one of said multiple computers in which said corresponding memory location for said memory address value(s) is replicated.

49. A method as in claim 1, including the further step of:
  a. updating said correspondence table(s), to include the replicated said corresponding memory locations of said memory address value(s), of said replcating.

50. A method as in claim 49, including the further step of:
  a. storing the local memory address value(s) of said replicated corresponding memory locations of said memory address value(s), to said identified corresponding ones of plural replica memory locations, on each one of said multiple computers in which said replication took place.

51. A method as in claim 1, including the step of:
  a. updating said plural replica memory locations of other computer(s) with new value(s) or content,
  wherein said plural replica memory location(s) are said first category memory locations, and wherein said new value(s) or content is said non-address value(s) or content.

52. A method as in claim 1, including the step of:
  a. updating said plural replica memory locations of other computer(s) with new value(s) or content, where said plural replica memory location(s) are said second category memory locations, and where said new value(s) or content is said empty or null or invalid memory address value(s).

53. A method as in claim 1, including the step of:
  a. updating said plural replica memory locations of other computer(s) with new value(s) or content, where said plural replica memory location(s) are said second category memory locations, and where said new value(s) or content is said memory address values or content, and where said updating comprises utilising said correspondence to determine (or resolve) the local memory address value(s) on each one of said other computers on which said plural replica memory location(s) reside, and to which said new value(s) are to correspond.

54. A method as in claim 1, including the step of:
  a. updating said plural replica memory locations of other computer(s) with new value(s) or content, where said plural replica memory location(s) are said second category memory locations, and where said new value(s) or content is said global name(s) or identifier(s), and where said updating comprises utilising said correspondence to determine (or resolve) the said global name(s) or identifier(s) assigned to (or allocated to) or associated with said plural replica memory locations.

55. A method as in claim 53, whereupon following utilising said correspondence to determine (or resolve) the local memory address value(s) on each other one of said multiple computers to which said new value(s) are to correspond, it is determined that corresponding memory locations are not replicated on one or more of said other computers, then including the step of:
  a. carrying out said updating of said plural replica memory locations of said other computer(s) in which corresponding memory locations are replicated to which said new value(s) are to correspond.

56. A method as in claim 55, including the further step of:
  a. replicating corresponding memory locations to which said new value(s) are to correspond, to/in said one or more non-replicating computers.

57. A method as in claim 56, including the further step of:
  a. updating said correspondence table(s), to include the replicated said corresponding memory locations of said memory address value(s) of said replicating.

58. A method as in claim 57, including the further step of:
  a. carrying out said updating with a different thread from the thread first causing said new value(s) or content to be stored (or updated) to a first of said plural replica memory locations.

59. A method as in claim 58, wherein said thread is a non-application program thread.

60. A method as in claim 59, wherein said non-application program thread does not operate or perform executable instructions or executable code of said application program.

61. A method as in claims 1, including the further step of:
  a. modifying said application program before, during, or after loading by inserting one or more updating operations in order to affect said updating.

62. A method as in claim 61, wherein said application program is modified in accordance with a procedure from a group of procedures consisting of re-compilation at loading, pre-compilation at loading, compilation prior to loading, just-in-time compilation, re-compilation after loading but before execution of the relevant portion of the application program, and re-compilation after execution of the relevant portion of the application program has commenced.

63. A method as in claim 58 wherein said modification procedures operate on each said computer.

64. A method as in claim 63, wherein said modified application program is transferred from a first computer to all other of said multiple computers, and loaded by said other multiple computers upon receipt or thereafter.

65. A method as in claim 1, wherein said local memory(ies) of each said computer are independent of said local memory(ies) of each other computer.

66. A method as in claim 1, wherein said local processors may only access said local memory(ies) of the same computer in which the local processor is located.

67. A method as in claim 1, wherein at least a first application program written to operate on a single one of said computers, is operating simultaneously on different ones of said multiple computers.

68. A method as in claim 67, wherein said application program operating simultaneously on each of said different ones of said computers, may only access said local memory(ies) of the same computer.

69. A method as in claim 68, wherein said access is satisfied by said local memory(ies) of the same computer independently of (or without the aid of) said local memory(ies) of any other computer.

70. A method as in claim 68, wherein said access includes reading and/or writing content or values stored or resident within said local memory(ies) of the same computer.

71. A method as in claim 69, wherein said access includes reading and/or writing content or values stored or resident within said local memory(ies) of the same computer.

72. A method as in claim 68, wherein said access is restricted to reading and/or writing content or values stored or resident within said local memory(ies) of the same computer.

73. A method as in claim 69, wherein said access is restricted to reading and/or writing content or values stored or resident within said local memory(ies) of the same computer.

74. A method as in claim 68, wherein said access includes reading and/or writing content or values of real or virtual memory addresses of or resident within said local memory(ies) of the same computer.

75. A method as in claim 69, wherein said access includes reading and/or writing content or values of real or virtual memory addresses of or resident within said local memory(ies) of the same computer.

76. A method as in claim 70, wherein said access includes reading and/or writing content or values of real or virtual memory addresses of or resident within said local memory(ies) of the same computer.

77. A method as in claim 68, wherein said access is restricted to reading and/or writing content or values of real or virtual memory addresses of or resident within said local memory(ies) of the same computer.

78. A method as in claim 69, wherein said access is restricted to reading and/or writing content or values of real or virtual memory addresses of or resident within said local memory(ies) of the same computer.

79. A method as in claim 70, wherein said access is restricted to reading and/or writing content or values of real or virtual memory addresses of or resident within said local memory(ies) of the same computer.

80. A method as in claim 68, wherein at least one memory location and/or memory value of said application program is replicated in said local memory(ies) of said different ones of said multiple computers.

81. A method as in claim 77, wherein said replicated memory location(s) and/or value(s) are stored non-identically in said local memory(ies) of said different ones of said multiple computers.

82. A method as in claim 78, wherein said replicated memory location(s) and/or memory value(s) are updated through in-due-course updating upon occasion of any one of said plurality of computers simultaneously operating said application program modifying, or causing to be modified, the value(s) or content(s) of said replicated memory location(s) and/or memory value(s).

83. A method as in claim 82, wherein each said replicated memory location(s) and/or value(s) of each one of said multiple computers is identified with an identifier.

84. A method as in claim 82, wherein said in-due-course updating provides that said replicated memory locations are updated upon occasion of any one of said computers simultaneously operating said application program causing modification of the contents of said replicated memory location.

85. A method as in claim 1, wherein the memory location(s) and/or value(s) of said local memory(ies) may be classified into a first category of memory locations each of which contains or stores non-address values or content, and a second category of memory locations each of which contains or stores memory address values or memory address contents of other memory location(s).

86. A method as in claim 1, wherein:
said local memory(ies) of each said computer are independent of said local memory(ies) of each other computer;
said local processors may only access said local memory(ies) of the same computer in which the local processor is located;
at least a first application program written to operate on a single one of said computers, is operating simultaneously on different ones of said multiple computers;
said application program operating simultaneously on each of said different ones of said computers, may only access said local memory(ies) of the same computer;
said access is satisfied by said local memory(ies) of the same computer independently of (or without the aid of) said local memory(ies) of any other computer;
said access includes reading and/or writing content or values stored or resident within said local memory(ies) of the same computer, or said access is restricted to reading and/or writing content or values stored or resident within said local memory(ies) of the same computer;
said access includes reading and/or writing content or values of real or virtual memory addresses of or resident within said local memory(ies) of the same computer, or said access is restricted to reading and/or writing content or values of real or virtual memory addresses of or resident within said local memory(ies) of the same computer;
at least one memory location and/or memory value of said application program is replicated in said local memory(ies) of said different ones of said multiple computers;
said replicated memory location(s) and/or value(s) are stored non-identically in said local memory(ies) of said different ones of said multiple computers;
said replicated memory location(s) and/or memory value(s) are updated through in-due-course updating upon occasion of any one of said plurality of computers simultaneously operating said application program modifying, or causing to be modified, the value(s) or content(s) of said replicated memory location(s) and/or memory value(s);each said replicated memory location(s) and/or value(s) of each one of said multiple computers is identified with an identifier; and
said in-due-course updating provides that said replicated memory locations are updated upon occasion of any one of said computers simultaneously operating said application program causing modification of the contents of said replicated memory location.

87. A method as in claim 1, further comprising:
maintaining a correspondence of or between ones of plural replica memory locations, where said ones of said plural replica memory locations are each on a different one of said multiple computers;
maintaining one or multiple correspondence table or record according to at least one predetermined scheme;
wherein said other memory location(s) includes at least one of said first category memory location(s) and said second category memory location(s); wherein each said correspondence is assigned or allocated or associated with a unique global name or identifier;
utilising said memory address value(s) to access said other memory location(s);wherein said plural replica memory locations comprises a plurality of replicated memory locations and/or values, each on a different one of said multiple computers, and which are updated with new values or content, and wherein said updating includes utilizing said correspondence to identify the corresponding said ones of said plural replica memory locations on each one of said multiple computers which are to be updated; and
wherein said replica memory locations are said second category memory locations, and where said new value(s) or content are said memory address value(s), and receiving said new value(s) transmitted by another one of said multiple computers, and where following utilising said correspondence to determine or resolve the local memory address value(s) on each one of said multiple computers to which said new value(s) correspond, and further comprising:
if it is determined that a corresponding memory location for said memory address value(s) is not replicated on one or more of said multiple computers, then including the steps of: (a) replicating the said corresponding memory location(s) of said memory address value(s) to/in said one or more non-replicated computer(s); and (b) storing said determined or resolved local memory address value(s) to said identified corresponding ones of plural replica memory locations, on each one of said multiple computers in which said corresponding memory location for said memory address value(s) is replicated; and if it is determined that no corresponding memory location for said memory address value(s) is replicated on one or more of said multiple computers, then including the steps of:

replicating the said corresponding memory location(s) of said memory address value(s) to/in said one or more non-replicating computer(s) in which said replica memory location(s) is replicated, and storing said determined or resolved local memory address value(s) to said identified corresponding ones of plural replica memory locations, on each one of said multiple computers in which said corresponding memory location for said memory address value(s) is replicated;

updating said plural replica memory locations of other computer(s) with new value(s) or content, wherein said plural replica memory location(s) are said first category memory locations, and wherein said new value(s) or content is said non-address value(s) or content;

carrying out said updating with a different thread from the thread first causing said new value(s) or content to be stored (or updated) to a first of said plural replica memory locations; and modifying said application program before, during, or after loading by inserting one or more updating operations in order to affect said updating.

88. A computer program product comprising computer readable instructions stored thereon which, when executed on a computer, carry out a method of classifying a local memory in at least one single computer capable of interoperating with at least one other computer coupled to said at least one single computer at least intermittently via a communications network to form a multiple computer system having a plurality of computers, wherein each computer has a local memory and the multiple computer system operates in a replicated shared memory arrangement, wherein each of the local has a local memory location and/or a memory value, the method of classifying said local memory comprising:

classifying said local memories into a first category of memory locations each of which contains or stores non-address values or content; and classifying said local memories into a second category of memory locations each of which contains or stores memory address values or memory address contents of other memory locations, wherein said memory locations comprise a plurality of replicated memory locations and/or values, each on a different one of said multiple computers, and which are updated with new values or content, and where said updating includes identifying the corresponding said ones of said plural replicated memory locations on each one of said multiple computers which are to be updated, wherein said replicated memory locations are said second category memory locations, and where said new value(s) or content are said memory address value(s), and receiving said new value(s) transmitted by another one of said multiple computers, and wherein, following utilizing said correspondence to determine or resolve the local memory address value(s) on each one of said multiple computers to which said new value(s) correspond, if it is determined that a corresponding memory location for said memory address value(s) is not replicated on one or more of said multiple computers, the method further comprises:

(a) replicating said corresponding memory location(s) of said memory address value(s) to/in said one or more non-replicated computer(s); and (b) storing said determined or resolved local memory address value(s) to said identified corresponding ones of plural replica memory locations, on each one of said multiple computers in which said corresponding memory location for said memory address value(s) is replicated; and if it is determined that no corresponding memory location for said memory address value(s) is replicated on one or more of said multiple computers, then including the steps of:

(c) replicating the said corresponding memory location(s) of said memory address value(s) to/in said one or more non-replicating computer(s) in which said replica memory location(s) is replicated, and (d) storing said determined or resolved local memory address value(s) to said identified corresponding ones of plural replica memory locations, on each one of said multiple computers in which said corresponding memory location for said memory address value(s) is replicated.

89. A multiple computer system comprising:

a plurality of computers, each including a local processor and a local memory coupled with the local processor, and including a first computer and a second computer interconnected via a communications link or network operating in a replicated shared memory arrangement comprising a plurality of replicated memory locations, the local memory(ies) having a local memory location(s) and/or a memory value(s);

wherein each said local processor is configured to classify said local memories into a first category of memory locations each of which contains or stores non-address values or content; and wherein each said local processor is configured to classify said local memories into a second category of memory locations each of which contains or stores memory address values or memory address contents of other memory location(s), wherein said plurality of replicated memory locations are each on a different one of said plurality of computers, and which are updated with new values or content, and where said updated values or content includes corresponding said ones of said plural replicated memory locations being identified on each one of said multiple computers which are to be updated, wherein said replicated memory locations are said second category memory locations, and where said new value(s) or content are said memory address value(s), wherein new value(s) transmitted by another one of said multiple computers are received by each said local processor, wherein, if it is determined that a corresponding memory location for said memory address value(s) is not replicated on one or more of said multiple computers, each said local processor is further configured to:

(a) replicate said corresponding memory location(s) of said memory address value(s) to/in said one or more non-replicated computer(s); and (b) store said determined or resolved local memory address value(s) to said identified corresponding ones of plural replica memory locations, on each one of said multiple computers in which said corresponding memory location for said memory address value(s) is replicated; and if it is determined that no corresponding memory location for said memory address value(s) is replicated on one or more of said multiple computers, each said local processor is configured to:

(c) replicate the said corresponding memory location(s) of said memory address value(s) to/in said one or more non-replicating computer(s) in which said replica memory location(s) is replicated, and (d) store said determined or resolved local memory address value(s) to said identified corresponding ones of plural replica memory locations, on each one of said multiple computers in which said corresponding memory location for said memory address value(s) is replicated.

* * * * *